United States Patent
Park et al.

(10) Patent No.: US 10,461,891 B2
(45) Date of Patent: Oct. 29, 2019

(54) STAGGERED PILOT PLACEMENT

(71) Applicant: QUALCOMM Incorporated, San Diego, CA (US)

(72) Inventors: Seyong Park, San Diego, CA (US); Wei Zeng, San Diego, CA (US); Joseph Binamira Soriaga, San Diego, CA (US); Jing Jiang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/267,009

(22) Filed: Sep. 15, 2016

(65) Prior Publication Data
US 2017/0180104 A1 Jun. 22, 2017

Related U.S. Application Data

(60) Provisional application No. 62/269,915, filed on Dec. 18, 2015.

(51) Int. Cl.
*H04L 1/00* (2006.01)
*H04L 5/00* (2006.01)
(Continued)

(52) U.S. Cl.
CPC .......... *H04L 1/0071* (2013.01); *H04J 11/004* (2013.01); *H04L 5/0007* (2013.01);
(Continued)

(58) Field of Classification Search
CPC . H04L 5/0073; H04L 27/2613; H04L 5/0048; H04L 1/0071; H04L 5/0051; H04J 11/0036; H04W 88/02
See application file for complete search history.

(56) References Cited

U.S. PATENT DOCUMENTS 7,912,092 B2 3/2011 Kowalski
8,611,444 B2 12/2013 Shih
(Continued)

FOREIGN PATENT DOCUMENTS

WO WO-2008014473 A2 * 1/2008 .......... H04L 1/0025
WO 2015197142 A1 12/2015

OTHER PUBLICATIONS

"Agenda Item: 10.2.1—Performance Comparison of Pilot/Reference Signal Structures for E-UTRA Uplink", 3GPP Draft, R1-060879, UL Pilot Performance, 3rd Generation Partnership Project (3GPP), Mobile Competence Centre, 650, Route Des Lucioles, F-06921 Sophia-Antipolis Cedex, France, No. Athens, Mar. 27, 2006-Mar. 31, 2006, Mar. 21, 2006 (Mar. 21, 2006), XP050596061, 15 Pages.
(Continued)

*Primary Examiner* — Andrew Lai
*Assistant Examiner* — Chuong M Nguyen
(74) *Attorney, Agent, or Firm* — Arent Fox LLP

(57) ABSTRACT

In an aspect of the disclosure, a method, a computer-readable medium, and an apparatus are provided. The apparatus may be configured to receive a plurality of combined signals. Each combined signal may be on a tone of a plurality of tones. The apparatus may be configured to determine a first pilot signal on a first tone of the plurality of tones. The apparatus may be configured to generate an interference-reduced signal for the first tone by canceling the determined first pilot signal from a first combined signal on the first tone.

12 Claims, 17 Drawing Sheets

(51) Int. Cl.
   *H04L 27/26* (2006.01)
   *H04J 11/00* (2006.01)
   *H04W 88/02* (2009.01)

(52) U.S. Cl.
   CPC .......... *H04L 5/0048* (2013.01); *H04L 5/0062* (2013.01); *H04L 27/2613* (2013.01); *H04W 88/02* (2013.01)

(56) References Cited

U.S. PATENT DOCUMENTS

| | | |
|---|---|---|
| 9,137,076 B2 | 9/2015 | Luo et al. |
| 9,191,256 B2 | 11/2015 | Vojcic et al. |
| 2004/0131007 A1* | 7/2004 | Smee ............... H04B 7/0669 370/208 |
| 2008/0298524 A1* | 12/2008 | Koorapaty ......... H04L 25/0228 375/348 |
| 2010/0056197 A1* | 3/2010 | Attar ................. H04L 1/0026 455/522 |
| 2010/0208841 A1* | 8/2010 | Walton .............. H04B 7/0669 375/295 |
| 2011/0128909 A1* | 6/2011 | Luo ................... H04L 5/0023 370/328 |
| 2011/0267937 A1* | 11/2011 | Yoo ................... H04J 11/005 370/201 |
| 2013/0176881 A1* | 7/2013 | Fan ................... H04B 1/7105 370/252 |
| 2014/0036801 A1* | 2/2014 | Malladi ............. H04J 11/0023 370/329 |
| 2014/0153625 A1* | 6/2014 | Vojcic ............... H04L 1/005 375/224 |
| 2014/0269246 A1* | 9/2014 | Yoo ................... H04J 3/10 370/201 |
| 2017/0111147 A1* | 4/2017 | Cao ................... H04L 27/2613 |

OTHER PUBLICATIONS

Alcatel-Lucent., et al., "On the need of DM RS Enhancement for UL CoMP", 3GPP Draft, R1-114051, ULCOMP DMRS Final, 3rd Generation Partnership Project (3GPP), Mobile Competence Centre, 650, Route Des Lucioles, F-06921 Sophia-Antipolis Cedex, France, vol. RAN WG1, No. San Francisco, U.S.A, Nov. 14, 2011-Nov. 18, 2011, Nov. 8, 2011 (Nov. 8, 2011), XP050562216.
International Search Report and Written Opinion—PCT/US2016/065410—ISA/EPO—dated Apr. 4, 2017.
Gollakota S., et al., "ZigZag Decoding: Combating Hidden Terminals in Wireless Networks," Proceedings of the ACM SIGCOMM 2008 conference on Data communication, Aug. 17-22, 2008, pp. 159-170.

* cited by examiner

STAGGERED PILOT PLACEMENT

CROSS-REFERENCE TO RELATED APPLICATION(S)

This application claims the benefit of U.S. Provisional Application Ser. No. 62/269,915, entitled "STAGGERED PILOT PLACEMENT" and filed on Dec. 18, 2015, which is expressly incorporated by reference herein in its entirety.

BACKGROUND

Field

The present disclosure relates generally to communication systems, and more particularly, to techniques of staggered pilot placement at a user equipment (UE) that may be used to enable interference cancelation at an evolved Node B (eNodeB) or another type of base station.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer-readable medium, and an apparatus are provided. The apparatus may be configured to receive a plurality of combined signals. Each combined signal may be on a tone of a plurality of tones. Each combined signal may include a first symbol of a first plurality of symbols from a first UE and a second symbol of a second plurality of symbols from a second UE. The first plurality of symbols may include at least one first pilot symbol and at least one first data symbol, and the second plurality of symbols may include at least one second pilot symbol and at least one second data symbol. Each of the at least one first pilot symbol may be on a tone that carries one of the at least one second data symbol. The apparatus may be configured to determine a first pilot signal on a first tone of the plurality of tones. The first tone may carry a respective one of the at least one first pilot symbol and a respective one of the at least one second data symbol. The first pilot signal may be determined based on a channel element associated with the first tone and the respective one of the at least one first pilot symbol on the first tone. The apparatus may be configured to generate an interference-reduced signal for the first tone by canceling the determined first pilot signal from a first combined signal on the first tone.

In another aspect, an apparatus is provided. The apparatus may include means for receiving a plurality of combined signals. Each combined signal may be on a tone of a plurality of tones. Each combined signal may include a first symbol of a first plurality of symbols from a first UE and a second symbol of a second plurality of symbols from a second UE. The first plurality of symbols may include at least one first pilot symbol and at least one first data symbol, and the second plurality of symbols may include at least one second pilot symbol and at least one second data symbol. Each of the at least one first pilot symbol may be on a tone that carries one of the at least one second data symbol. The apparatus may include means for determining a first pilot signal on a first tone of the plurality of tones. The first tone may carry a respective one of the at least one first pilot symbol and a respective one of the at least one second data symbol. The first pilot signal may be determined based on a channel element associated with the first tone and the respective one of the at least one first pilot symbol on the first tone. The apparatus may include means for generating an interference-reduced signal for the first tone by canceling the determined first pilot signal from a first combined signal on the first tone. The apparatus may include mean for determining a second pilot signal on a second tone of the plurality of tones. The second tone may carry a respective one of the at least one second pilot symbol and a respective one of the at least one first data symbol. The second pilot signal may be determined based on a second channel element associated with the second tone and the respective one of the at least one second pilot symbol on the second tone. The apparatus may include means for generating a second interference-reduced signal for the second tone by canceling the determined second pilot signal from a second combined signal on the second tone. The apparatus may include means for demodulating the interference-reduced signal, the second interference-reduced signal, and remaining signals on a subset of tones of the plurality of tones to decode the at least one first data symbol and the at least one second data symbol. In an aspect, a first set of periodic pilot signals from the first UE and a second set of periodic pilot signals from the second UE are shifted by a cyclic shift. In another configuration, the apparatus may include means for providing a cyclic shift to the first UE. In another configuration, the apparatus may include means for de-interleaving the plurality of combined signals to determine a first set of pilot signals from the first UE, first and second code blocks from the first UE, a second set of pilot signals from the second UE, and third and fourth code blocks from the second UE. In another aspect, the first set of pilot signals may correspond to a first number tones, and the first number tones may be equal to half a second number of tones in the third code block. In another aspect, the first set of pilot signals from the first UE may overlap with the third code block from the second UE, and the second set of pilot signals from the second UE may overlap with the second code block from the first UE. In another configuration, the apparatus may include means for performing successive decoding after deinterleaving the plurality of combined signals. In another configuration, the means for successive decoding may be configured to decode the third code block by canceling the first set of pilot signals from the third code block, to decode the first code block by canceling the third code block from the first code block, to decode the fourth code block by canceling the first code block from the fourth code block, and to decode the second code block by canceling the fourth code block from the second code block.

In another aspect, a computer-readable medium storing computer executable code is provided. The computer-readable medium may include code to receive a plurality of combined signals. Each combined signal may be on a tone of a plurality of tones. Each combined signal may include a first symbol of a first plurality of symbols from a first UE and a second symbol of a second plurality of symbols from a second UE. The first plurality of symbols may include at least one first pilot symbol and at least one first data symbol, and the second plurality of symbols may include at least one second pilot symbol and at least one second data symbol. Each of the at least one first pilot symbol may be on a tone that carries one of the at least one second data symbol. The computer-readable medium may include code to determine a first pilot signal on a first tone of the plurality of tones. The first tone may carry a respective one of the at least one first pilot symbol and a respective one of the at least one second data symbol. The first pilot signal may be determined based on a channel element associated with the first tone and the respective one of the at least one first pilot symbol on the first tone. The computer-readable medium may include code to generate an interference-reduced signal for the first tone by canceling the determined first pilot signal from a first combined signal on the first tone.

In another aspect of the disclosure, a method, a computer-readable medium, and an apparatus are provided. The apparatus may be configured to map, at a first UE, a first set of pilot symbols and a first set of data symbols to a plurality of tones. Each pilot symbol in the first set of pilot symbols may be mapped on a tone that is used by a second UE to carry a data symbol. The apparatus may be configured to provide the first set of pilot symbols and the first set of data symbols for transmission over the plurality of tones.

In another aspect, an apparatus is provided. The apparatus may include means for mapping, at a first UE, a first set of pilot symbols and a first set of data symbols to a plurality of tones. Each pilot symbol in the first set of pilot symbols may be mapped on a tone that is used by a second UE to carry a data symbol. The apparatus may include means for providing the first set of pilot symbols and the first set of data symbols for transmission over the plurality of tones. In another aspect, a data symbol in the first set of data symbols may be mapped on a tone that is used by the second UE to carry a pilot symbol. In another aspect, the first set of pilot symbols may be transmitted on tones shifted by a cyclic shift from a second set of pilot symbols that is concurrently transmitted by the second UE. In another configuration, the apparatus may include means for receiving the cyclic shift for staggering the first set of pilot symbols from a base station. In another aspect, the cyclic shift for staggering the first set of pilot symbols is randomly selected from a set of cyclic shift values based on an identifier associated with the first UE. In another aspect, the first set of data symbols may be associated with a same code block.

DETAILED DESCRIPTION

Figure 1:
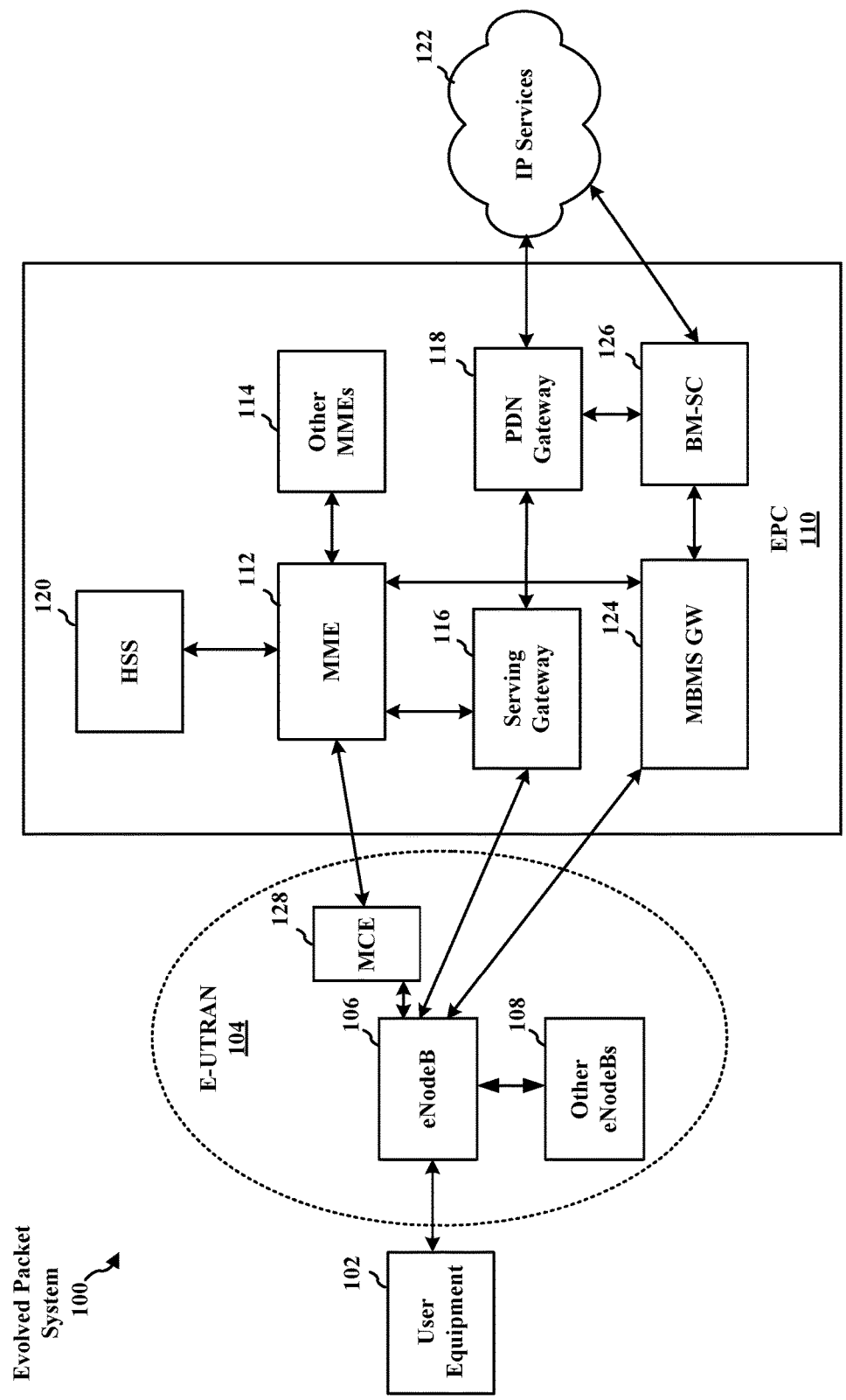
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMES 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MIME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
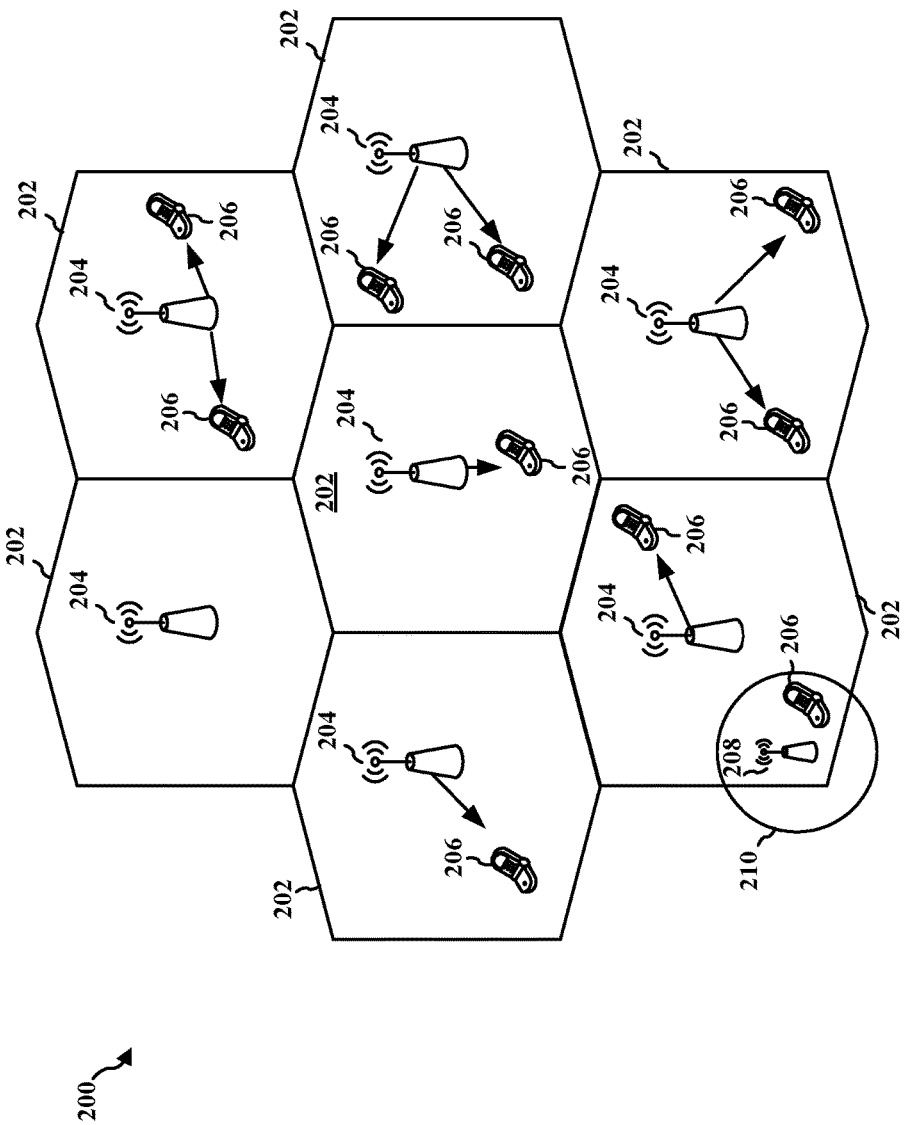
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
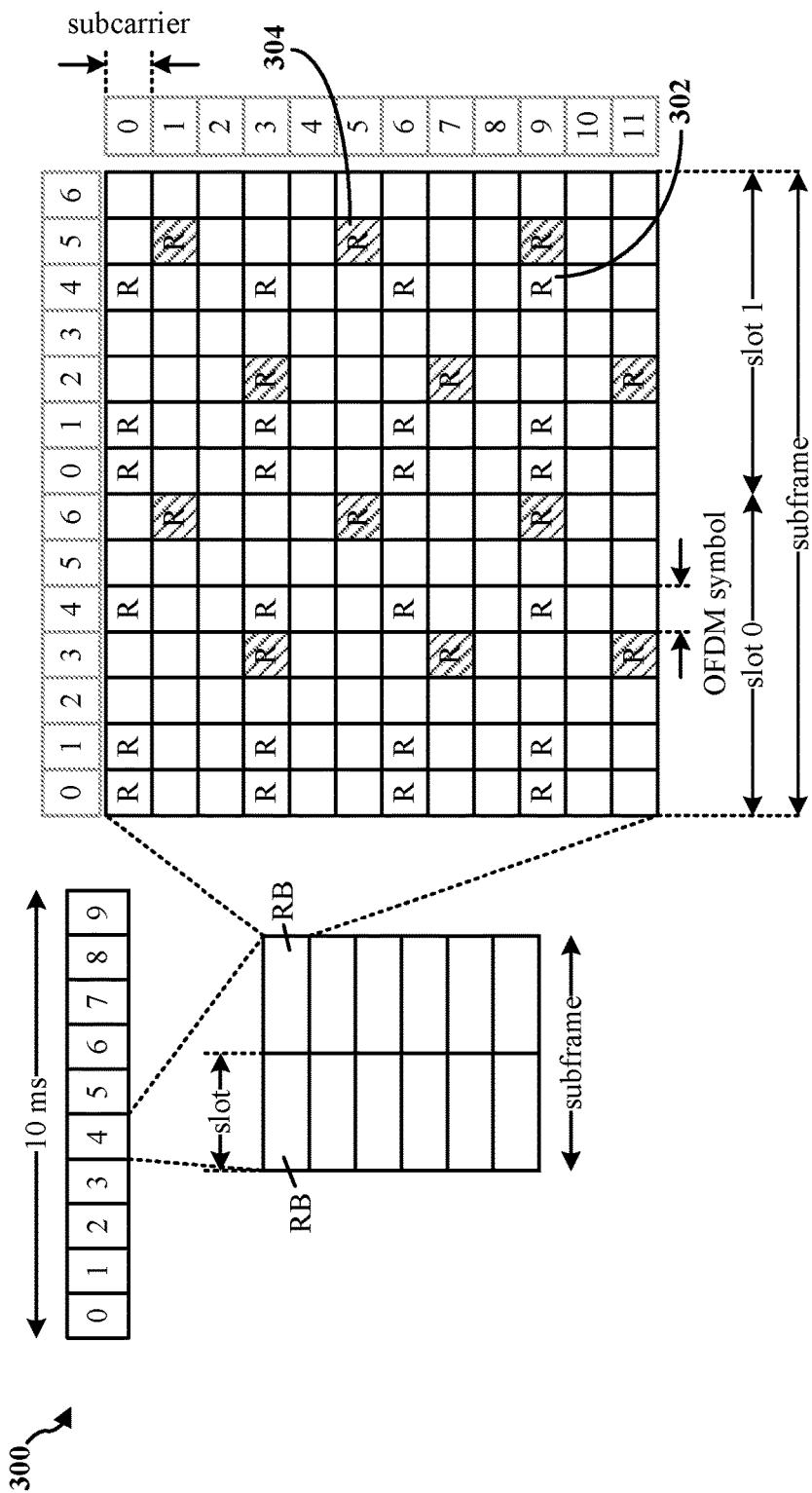
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
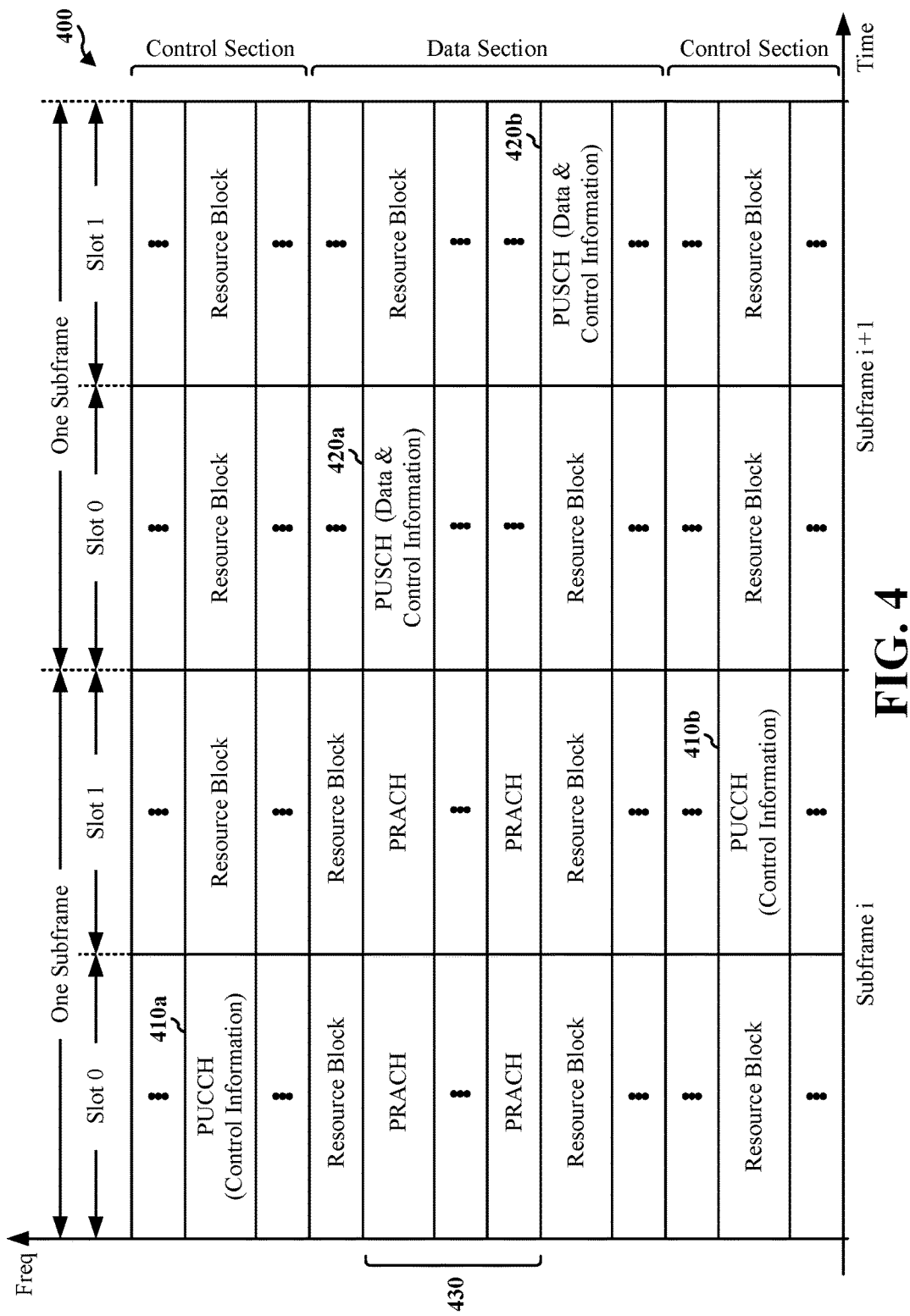
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
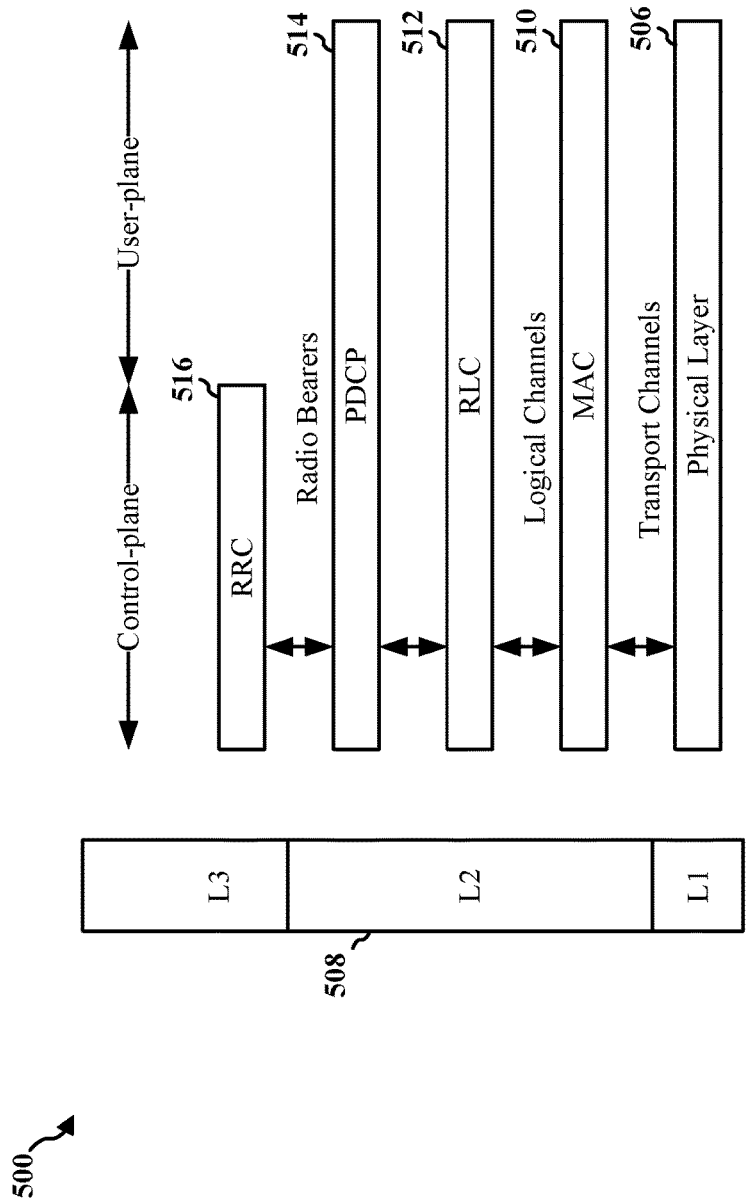
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506.

Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
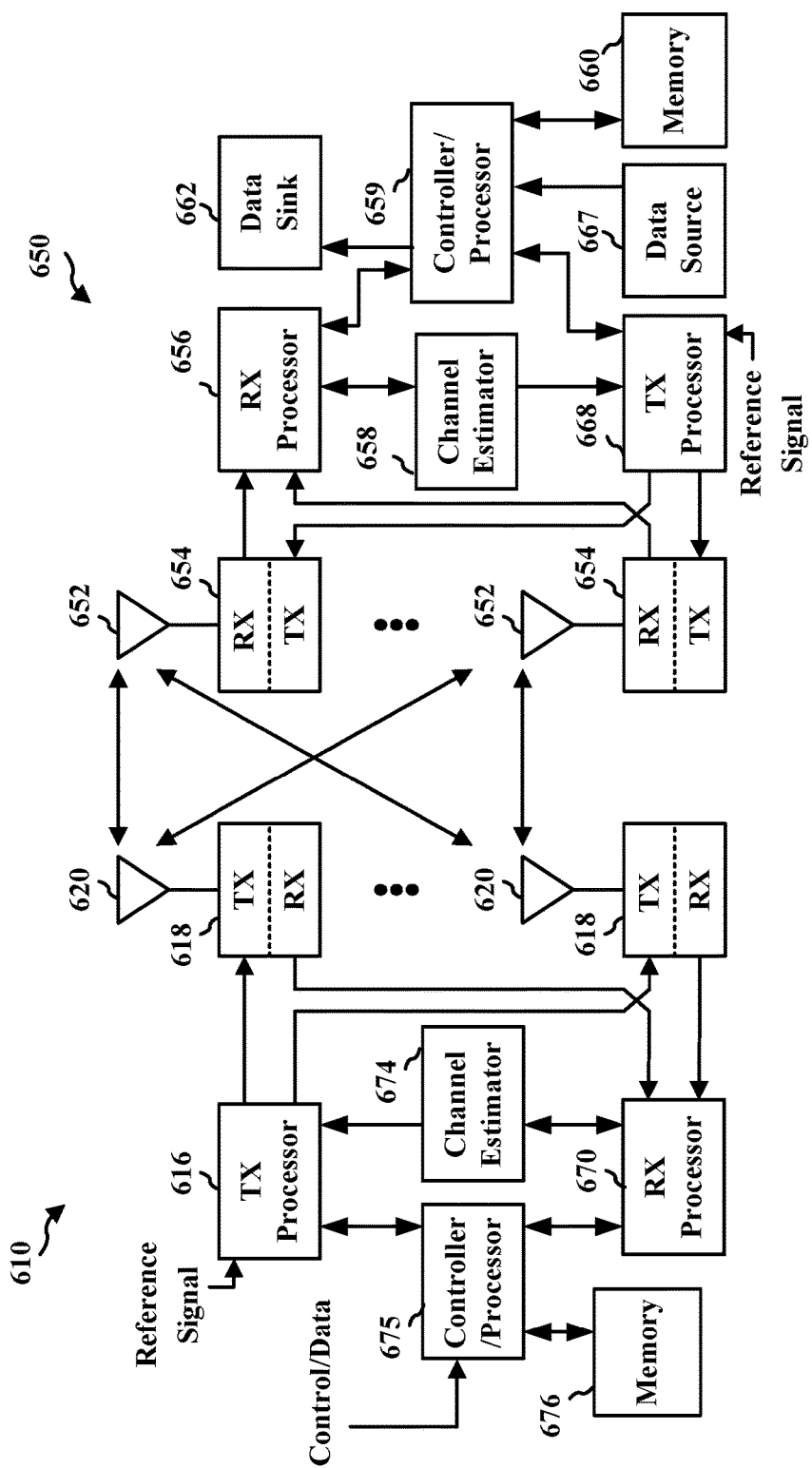
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

For Internet-of-everything (IoE) uplink, the number of UEs may be more than the number available time/frequency resources. A time/frequency resource may be the resource in a symbol period on a particular tone (or frequency).

A UE may use resource shared multiple access (RSMA) to share time/frequency resources. In other words, multiple UEs can use the same time/frequency resources to transmit uplink signals to a base station. The base station may perform successive-decoding. In particular, the base station may decode signals from one UE while treating signals from other UEs as noise. The decoded signals may be canceled or subtracted from the received combined signals after decoding.

Figure 7:
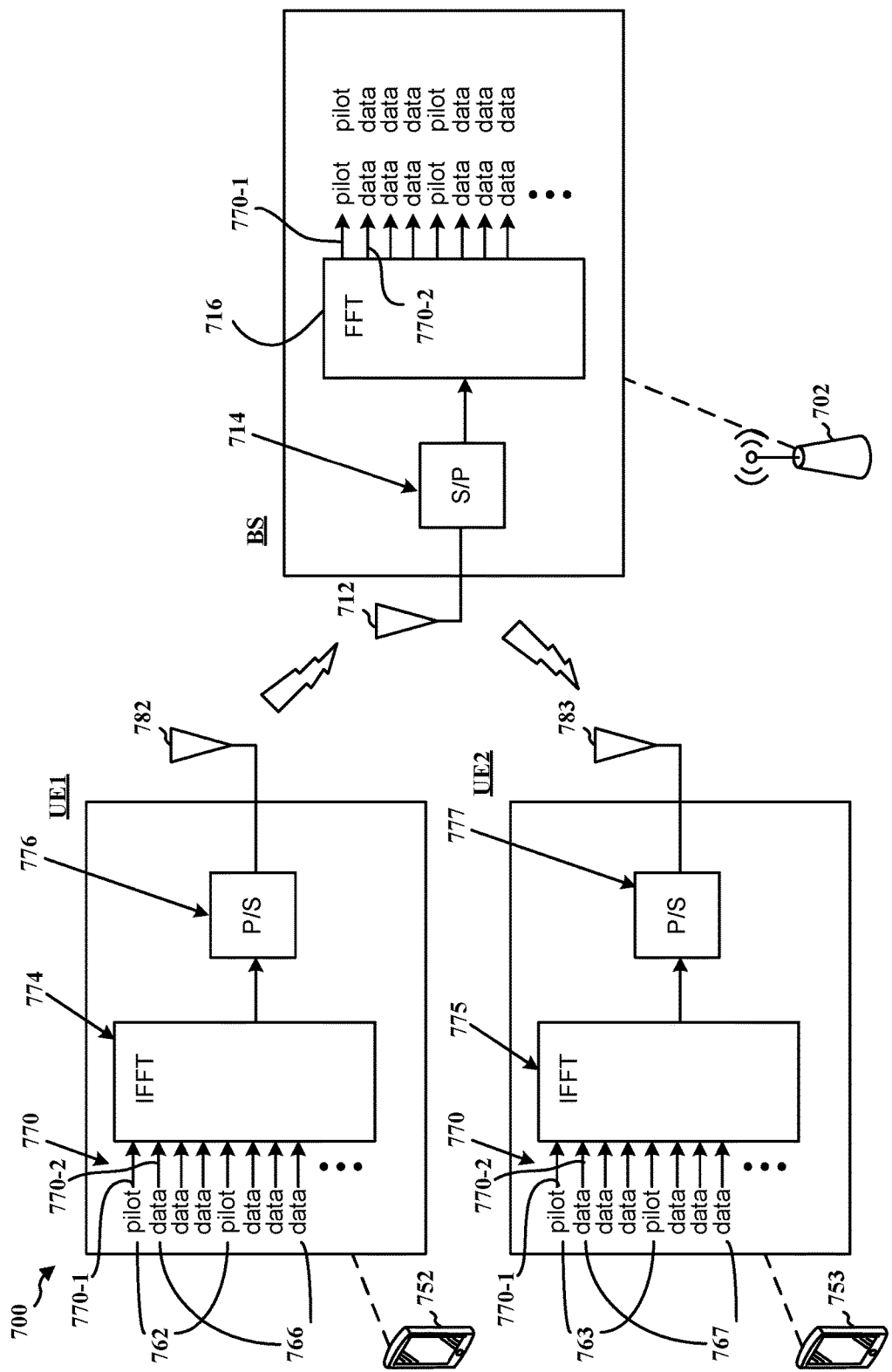
FIG. 7 is a diagram illustrating communication between an eNodeB and two UEs.

FIG. 7 is a diagram 700 illustrating communication between an eNodeB and two UEs utilizing RSMA. In a first technique, a UE 752 maps, in a particular symbol period, one or more pilot symbols 762, each on a tone 770, and maps one or more data symbols 766, each on a tone 770. Further, a UE 753 maps, in the same symbol period, one or more pilot symbols 763, each on a tone 770, and maps one or more data symbols 767, each on a tone 770. As an example, FIG. 7 illustrates 2 pilot symbols 762 and 6 data symbols 766 at the UE 752 and 2 pilot symbols 763 and 6 data symbols 767 at the UE 753. A pilot symbol 762 is mapped on the same tone 770 of a pilot symbol 763. A data symbol 766 is mapped on the same tone 770 of a data symbol 767. Further, the pilot symbols 762 and the data symbols 766 are sent to an IFFT component 774 of the UE 752, at which an inverse fast Fourier transform is applied to the pilot symbols 762. The IFFT component 774 sends the generated signals to a parallel-to-serial converter 776, which performs a parallel-to-serial conversion to the generated signals. The output from the parallel-to-serial converter 776 is a time domain signal, which is transmitted to the eNodeB 702 through an antenna 782. Similarly, the pilot symbols 763 and the data symbols 767 are sent to an IFFT component 775 of the UE 753. The IFFT component 775 sends the generated signals to a parallel-to-serial converter 777, which generates a time domain signal that is transmitted to the eNodeB 702 through an antenna 783.

The eNodeB 702 receives the combined time domain signals transmitted from the UE 752 and the UE 753 at an antenna 712. The received combined signals are sent to a serial-to-parallel converter 714 for serial-to-parallel conversion. The serial-to-parallel converter 714 sends the converted combined signal to an FFT component 716, at which a Fast Fourier Transform is applied to the converted combined signal to generate a combined signal on each of the tones 770. Each combined signal may include a signal derived from a symbol transmitted from the UE 752 and a signal derived from a symbol transmitted from the UE 753. For example, the UE 752 transmits a pilot symbol 762 on a first tone 770-1 to the eNodeB 702, and the UE 753 transmits a pilot symbol 763 on the first tone 770-1 to the eNodeB 702. Accordingly, the FFT component 716 outputs on the first tone 770-1 a combined signal that includes a pilot signal derived from the pilot symbol 762 and a pilot signal derived from the pilot symbol 763. Further, the UE 752 transmits a data symbol 766 on a second tone 770-2 to the eNodeB 702, and the UE 753 transmits a data symbol 767 on the second tone 770-2 to the eNodeB 702. Accordingly, the FFT component 716 outputs on the second tone 770-2 a combined signal that includes a data signal derived from the data symbol 766 and a data signal derived from the data symbol 767.

As described above, upon obtaining the combined signal on a tone 770, the eNodeB 702 may attempt demodulate and decode the pilot signal or the data signal derived from the symbol of one of the UEs 752, 753 while treating the corresponding pilot signal or the corresponding data signal derived from the symbol of the other one of the UEs 752, 753 as noise. It has been observed that the demodulation and decoding accuracy of this technique may not be ideal and may be further improved.

In a second technique, different UEs may be configured to map their respective pilot symbols (e.g., modulated symbols) on different time/frequency resources. As described below, staggered pilot placement may provide non-overlapping pilot placement. In the staggered pilot placement, each UE may shift its periodic pilot placement with a different cyclic shift in frequency. This non-overlapping pilot placement may be exploited in a pilot-aid interference cancellation (PIC) decoder.

Figure 8:
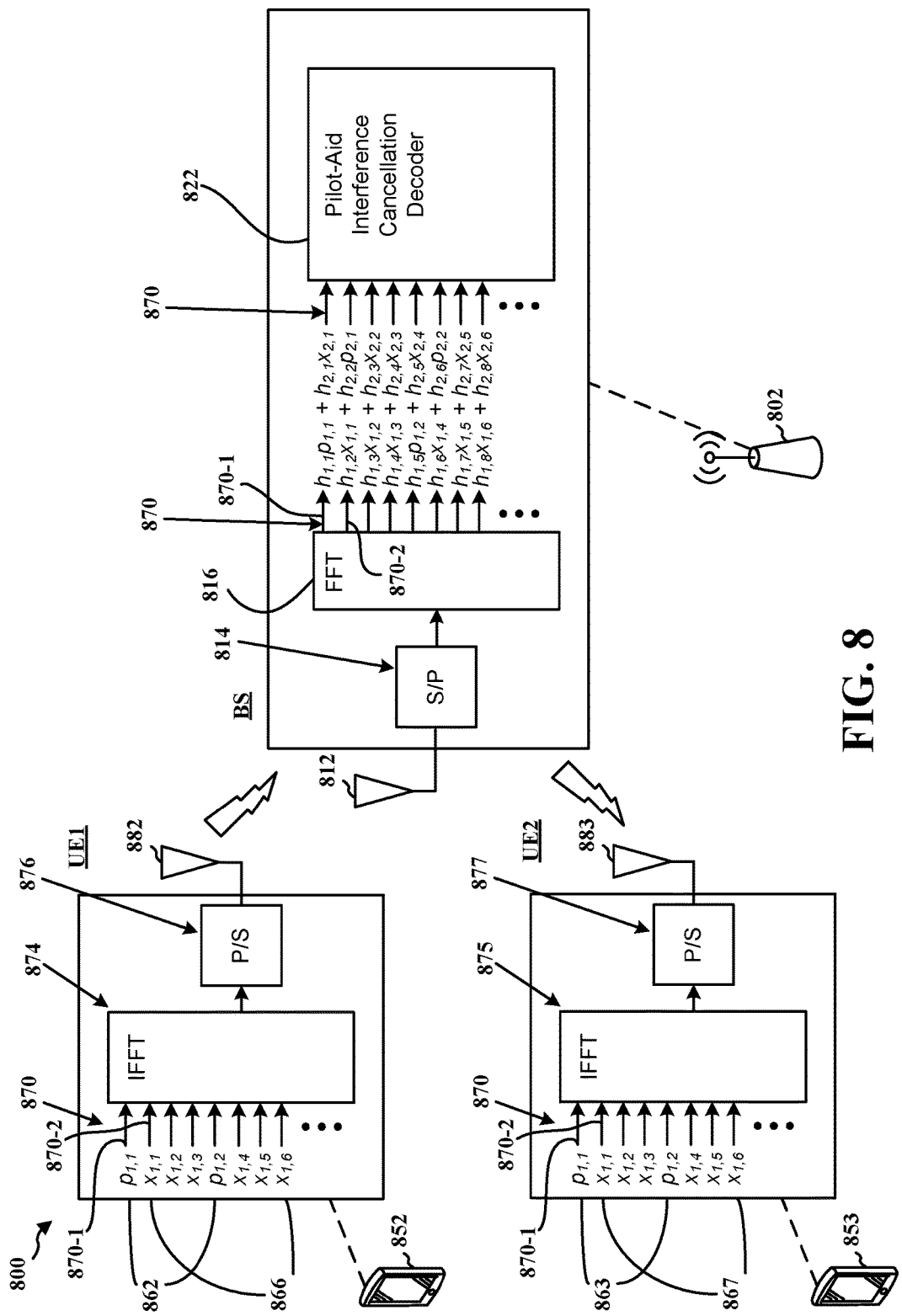
FIG. 8 is a diagram illustrating communication between an eNodeB and two UEs.

FIG. 8 is a diagram 800 illustrating communication between an eNodeB and two UEs. Referring to FIG. 8, a UE 852 maps one or more pilot symbols 862 and one or more data symbols 866 on tones 870. The pilot symbols and data symbols may be modulated symbols (e.g., modulated by QPSK, QAM, etc.). Further, each of the pilot symbols 862 is on a tone that carries one of the data symbols 867. A UE 853 maps one or more pilot symbols 863 and one or more data symbols 867 on the tones 870. In this disclosure, $p_{i,j}$ denotes a $j^{th}$ pilot symbol at the $i^{th}$ UE. $x_{i,j}$ denotes a $j^{th}$ data symbol at the $i^{th}$ UE. More specifically, FIG. 8 shows that, as an example, the UE 852 maps $p_{1,1}$, $x_{1,1}$, $x_{1,2}$, $x_{1,3}$, $p_{1,2}$, $x_{1,4}$, $x_{1,5}$, $x_{1,6}$ in that order on 8 tones 870. The UE 853 maps $x_{2,1}$, $p_{2,1}$, $x_{2,2}$, $x_{2,3}$, $x_{2,4}$, $p_{2,2}$, $x_{2,5}$, $x_{2,6}$ in that order on the same 8 tones 870. As shown in FIG. 8, the pilot locations for the UE 853 may be cyclically shifted from the pilot locations for the UE 852. In one aspect, the cyclic shift amount may be signaled and assigned by the eNodeB 802. The signaling may be unicasted to individual UEs or broadcasted with a UE identifier, such that each UE may determine a cyclic shift value based on its respective UE identifier. In another aspect, the UE 852, for example, may randomly select from among a set of cyclic shift values based on the identifier for the UE 852. That is, the cyclic shift value may be a function of the UE identifier.

The pilot symbols 862 and the data symbols 866 are processed by an IFFT component 874 and a parallel-to-serial converter 876 of the UE 852 to generate a time domain signal. The pilot symbols 863 and the data symbols 867 are processed by an IFFT component 875 and a parallel-to-serial converter 877 of the UE 853 to generate a time domain signal.

An eNodeB 802 receives the combined signals transmitted from the UE 852 and the UE 853, and the received combined signals are processed by a serial-to-parallel converter 814 and an FFT component 816 to generate the combined signal on each of the tones 870.

Further, $s_{1,k}$ denotes the symbol (i.e., a pilot symbol 862 or a data symbol 866) transmitted by the UE 852 on the $k^{th}$ tone. $s_{2,k}$ denotes the symbol (i.e., a pilot symbol 863 or a data symbol 867) transmitted by the UE 853 on the $k^{th}$ tone. $y_k$ denotes the combined signal generated by the FFT component 816 on the $k^{th}$ tone. A channel matrix for the $k^{th}$ tone is:

$$H_k = \begin{pmatrix} h_{1,k} & 0 \\ 0 & h_{2,k} \end{pmatrix}$$

The combined signal $y_k$ is:

$$y_k = \begin{pmatrix} h_{1,k} & 0 \\ 0 & h_{2,k} \end{pmatrix} \begin{pmatrix} s_{1,k} \\ s_{2,k} \end{pmatrix}$$

where the noise on the $k^{th}$ tone has been eliminated or ignored. For example, on the first tone 870-1 and the second tone 870-2, the combined signals are:

$$y_1 = h_{1,1}p_{1,1} + h_{2,1}x_{2,1}$$

$$y_2 = h_{1,2}x_{1,1} + h_{2,2}p_{2,1}$$

Subsequently, the FFT component 816 sends the combined signals to a PIC decoder 822.

Figure 9:
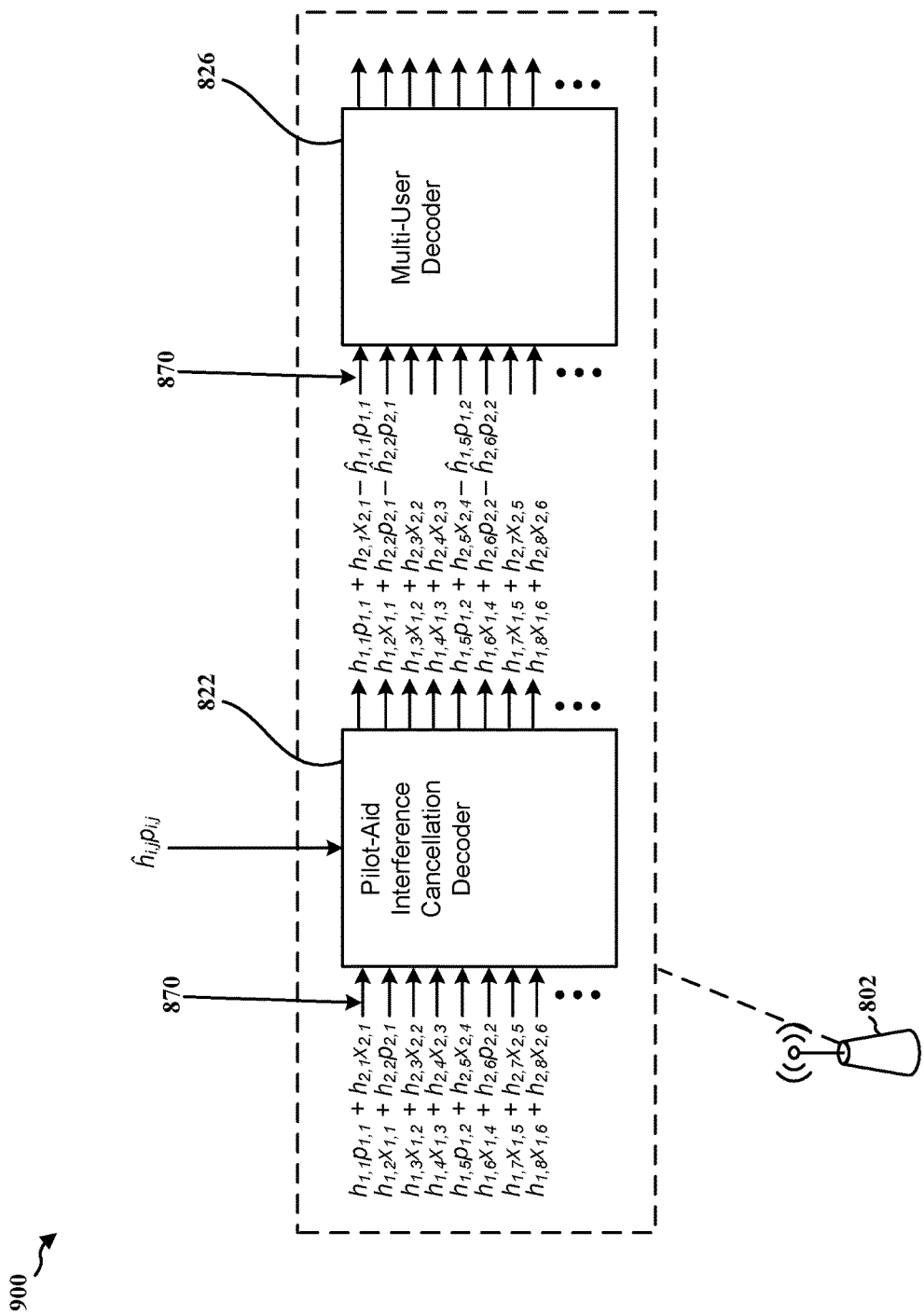
FIG. 9 is a diagram illustrating demodulation and decoding procedures at an eNodeB.

FIG. 9 is a diagram 900 illustrating demodulation and decoding procedures at an eNodeB. The PIC decoder 822 of the eNodeB 802 receives the combined signal on each tone 870. For a $k^{th}$ tone carrying a pilot symbol from either the UE 852 or the UE 853, the PIC decoder 822 knows the estimated channel $h'_{i,k}$ and $p_{i,k}$, where i is 1 or 2 in this example. In an aspect, the PIC decoder 822 may know the estimated channel $h'_{i,k}$ based on UE feedback and/or prior transmissions, and $p_{i,k}$ may be preconfigured. Thus, the PIC decoder 822 can estimate a pilot signal derived from the $p_{i,k}$: $h'_{i,k}p_{i,k}$. The PIC decoder 822 may cancel the pilot signal $h'_{i,k}p_{i,k}$ from the combined signal $y_k$ (e.g., i may be 1 and may indicate a pilot symbol from the UE 852). The remaining signal of the combined signal is a data signal derived from the data symbol from the other UE on the $k^{th}$ tone. As such, the PIC decoder 822 may cancel the pilot signals on the tones 870. In this way, the noise or interference are reduced for the remaining data signals.

FIG. 9 shows that in this example, the $1^{st}$, $2^{nd}$, $5^{th}$ and $6^{th}$ tones 870 each carry a pilot signal. Accordingly, the remaining signals on those tones are:

$$y_1 - h'_{1,1}p_{1,1} = h_{1,1}p_{1,1} + h_{2,1}x_{2,1} - h'_{1,1}p_{1,1}$$

$$y_2 - h'_{2,2}p_{2,1} = h_{1,2}x_{1,1} + h_{2,2}p_{2,1} - h'_{2,2}p_{2,1}$$

$$y_5 - h'_{1,5}p_{1,2} = h_{1,5}p_{1,2} + h_{2,5}x_{2,4} - h'_{1,5}p_{1,2}$$

$$y_6 - h'_{2,6}p_{2,2} = h_{1,6}x_{1,4} + h_{2,6}p_{2,2} - h'_{2,6}p_{2,2}$$

Subsequently, the PIC decoder 822 sends the remaining signals (e.g., data signals) to a multi-user decoder 826. The multi-user decoder 826 may decode the remaining signals to obtain the information from the data symbols from the UE 852 and the UE 853 carried on the tones 870. For example, the multi-user decoder 826 may be a successive interference decoder.

One transmission block (spans over one or multiple OFDM symbol periods) may include pilot tones and multiple code blocks. In an aspect, code blocks may include data symbols or bits but not pilot symbols. In additional to staggered pilot placement, in a third technique, each code block may be allocated as described below to facilitate the successive decoding. In certain configurations, one UE may allocate code blocks in a way such that data symbols on the tones that also carry pilot symbols from another UE belong to the same code block.

Figure 10:
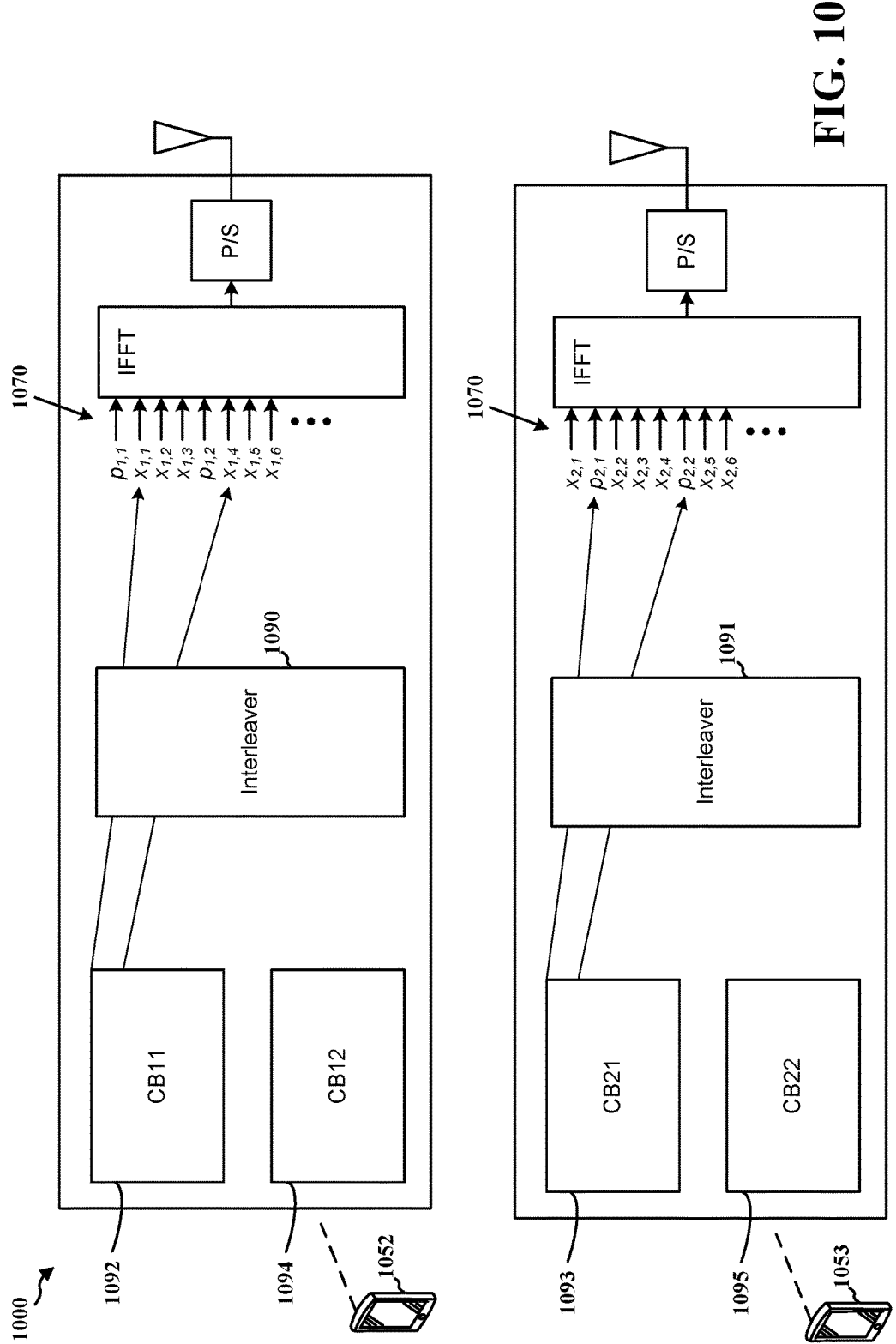
FIG. 10 is a diagram illustrating procedures of mapping pilot symbols and data symbols at a UE.

FIG. 10 is a diagram 1000 illustrating procedures of mapping pilot symbols and data symbols at a UE. A UE 1052 has information that the $2^{nd}$ and the $6^{th}$ tones 1070 carry pilot symbols (e.g., $p_{2,1}$ and $p_{2,2}$) from a UE 1053. Thus, an interleaver 1090 of the UE 1052 may allocate data symbols derived from information bits of the same code block (e.g., a code block 1092) to the $2^{nd}$ and the $6^{th}$ tones. Similarly, the UE 1053 has information that the $1^{st}$ and the $5^{th}$ tones 1070 carry pilot symbols (e.g., $p_{1,1}$ and $p_{1,2}$) from the UE 1052. Thus, an interleaver 1091 of the UE 1053 may allocate data symbols derived from information bits of the same code block (e.g., a code block 1093) to the $1^{st}$ and the $5^{th}$ tones.

Figure 11:
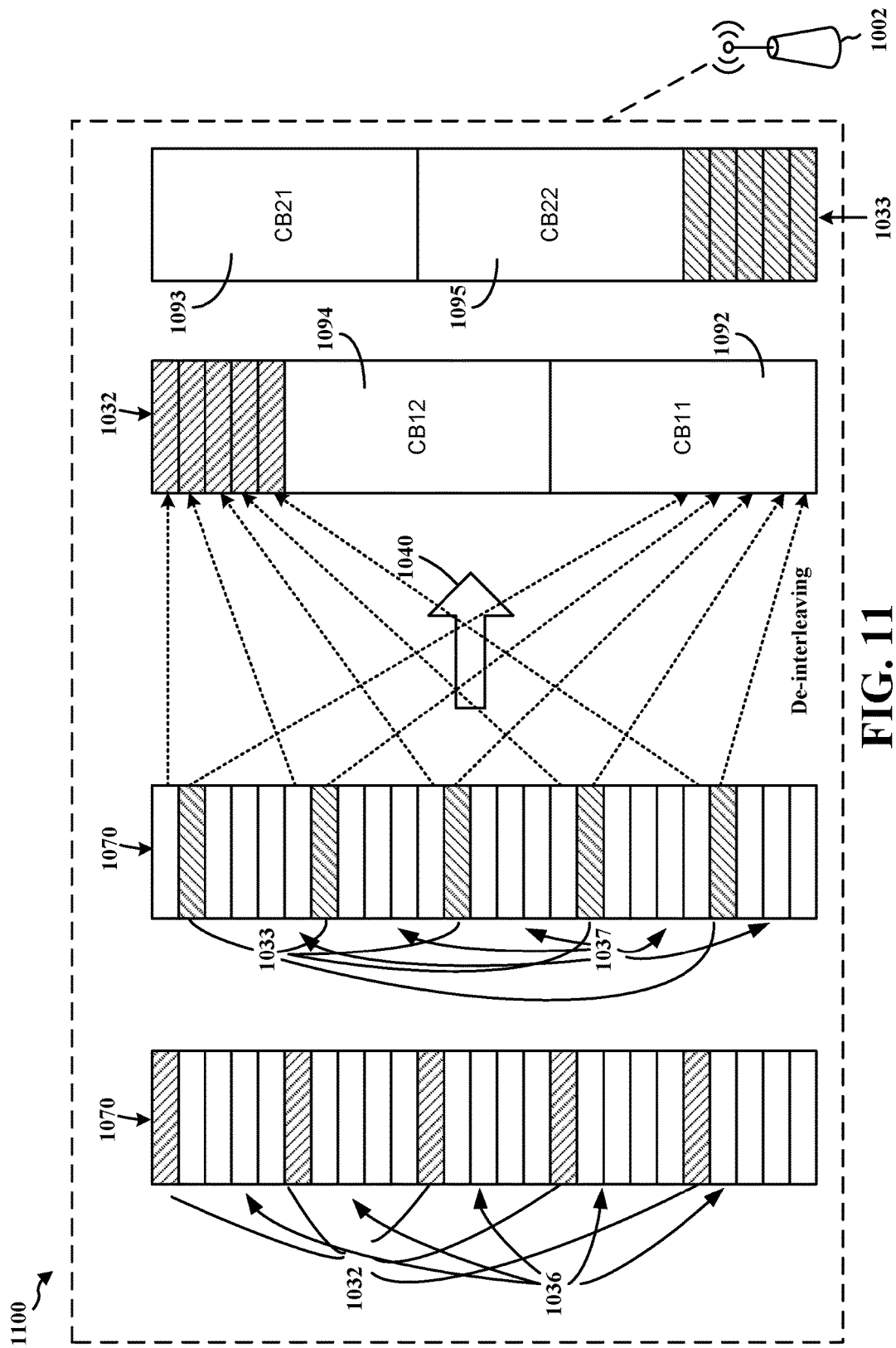
FIG. 11 is a diagram illustrating demodulation and decoding procedures at an eNodeB.

FIG. 11 is a diagram 1100 illustrating demodulation and decoding procedures at an eNodeB. An eNodeB 1002 receives pilot signals 1032 and data signals 1036 on the tones 1070 from the UE 1052. The eNodeB 1002 also receives pilot signals 1033 and data signals 1037 on the tones 1070 from the UE 1053. As shown in FIG. 11, the pilot signals 1033 have been subjected to a different cyclic shift than the pilot signals 1032. In an aspect, a cyclic shift may be different from a frequency offset. When a cyclic shift is performed, all of the tones may still be occupied, but the pilot tone locations may be shifted. By contrast, when a frequency offset is performed, certain tones from which the offset begins may be left empty.

Referring to FIG. 11, the eNodeB 1002 has information that, as described supra, the tones 1070 carrying the pilot signals 1032 also carry data signals 1037 derived from the information bits of the same code block, e.g., the code block 1093. Further, the tones 1070 carrying the pilot signals 1033 also carry data signals 1036 derived from the information bits of the same code block, e.g., the code block 1092.

Using the second technique described supra, the eNodeB 1002 may estimate the pilot signals 1032 and may cancel the pilot signals 1032 from the combined signals carried on those tones 1070 carrying the pilot signals 1032. The remaining signals on the tones 1070 carrying the pilot signals 1032 are data signals 1037 derived from the code block 1093 of the UE 1053. After a deinterleaving procedure 1040, the pilot signals 1032 from the UE 1052 overlap with the data signals 1037 derived from the code block 1093 of the UE 1053. That is, all the pilot signals 1032 from the UE 1052 may overlap with the code block 1093 of the UE 1053. As an example, the number of tones carrying the pilot signals 1032 may be half of the number of tones carrying the data signals 1037 derived from the code block 1093. As such, the eNodeB 1002 may be able to demodulate and decode all the data signals 1037 derived from the code block 1093 more accurately. The eNodeB 1002 may thus obtain codewords of the code block 1093.

Further, as illustrated in FIG. 11, after the deinterleaving procedure 1040, the tones 1070 carrying the data signals 1037 derived from the code block 1093 overlap with the tones 1070 carrying the data signals 1036 derived from the code block 1094. As such, the eNodeB 1002 may cancel the data signals 1037 derived from the code block 1093 from the combined signals carried on the overlapping tones. The remaining signals on the overlapping tones are data signals 1036 derived from the code block 1094. In this way, the eNodeB 1002 may be able to demodulate and decode all the data signals 1036 derived from the code block 1094 more accurately. The eNodeB 1002 may thus obtain codewords of the code block 1094.

Similarly to what was described supra, the tones 1070 carrying the data signals 1036 derived from the code block 1094 overlap with the tones 1070 carrying the data signals 1037 derived from the code block 1095. The eNodeB 1002 may cancel the data signals 1036 derived from the code block 1094 in order to demodulate and decode the data signals 1037 derived from the code block 1095.

Further, the tones 1070 carrying the data signals 1037 derived from the code block 1095 overlap with the tones 1070 carrying the data signals 1036 derived from the code block 1092. The tones 1070 carrying the pilot signals 1033 may also overlap with the tones 1070 carrying the data signals 1036 derived from the code block 1092. As such, the eNodeB 1002 may cancel the data signals 1037 derived from the code block 1095 and/or the pilot signals 1033 in order to demodulate and decode the data signals 1036 derived from the code block 1092.

In other words, the efficiency of the PIC decoder 822 may be further improved by carefully designing interleavers. The PIC decoder 822 may assume that pilot tones are not aligned, but data bits may be selectively located to improve performance. For example, for the UE 1052, the data bits from CB11 are located in the tones that correspond to the pilot locations of UE 1053. For UE 1053, the data bits from CB21 may be located in the tones that correspond to the pilot locations of UE 1052. That is, all of the pilot locations from UE 1052 correspond to CB21 of the UE 1053. Referring to FIG. 11, after deinterleaving, all the pilot locations of the UE 1052 may overlap with the data bits from CB21 of the UE 1053, and all the pilot locations of the UE 1052 may overlap with the data bits from CB11 of the UE 1052. Based on the foregoing cyclic shifts in frequency and alignments, successive decoding may be performed. For example, the pilot signals 1032 are canceled from CB21 and CB21 may be decoded. CB21 may be canceled from CB12, and then CB12 may be decoded. Then, CB12 may be canceled from CB22, and CB22 may be decoded. Then, CB22 may be canceled from CB11, and CB11 may be decoded. In an aspect, the pilot signals 1033 may be canceled from CB11 before CB11 is decoded. As shown in FIG. 11, each code block of the UE 1053 may overlap with at most two code blocks of the UE 1052, and vice versa. If the code block from the UE 1052 overlaps with the pilot signals from the UE 1053, the then the code block only overlaps with one other code block of the UE 1053, and vice versa. Although FIG. 11 illustrates the successive decoding process starting from the pilot signals 1032, the decoding process may also begin from the bottom at the pilot signals 1033. If the decoding process fails in both directions, then the eNodeB 1002 may determine that the decoding has failed. Otherwise, if the decoding only fails in one direction, the eNodeB 1002 may attempt decoding in a different direction. In another aspect, because the CB11 has a greater amount of interference canceled (e.g., interference from CB22 and from the pilot signals 1033), the UE 1052 may transmit CB22 at a higher MCS compared with other code blocks (e.g., CB12). The same may be true of the UE 1053 for CB21. In other words, UEs may transmit code blocks that overlap with another UE's pilot tone locations at a higher MCS than code blocks that do no overlap with another UE's pilot tone locations.

Figure 12:
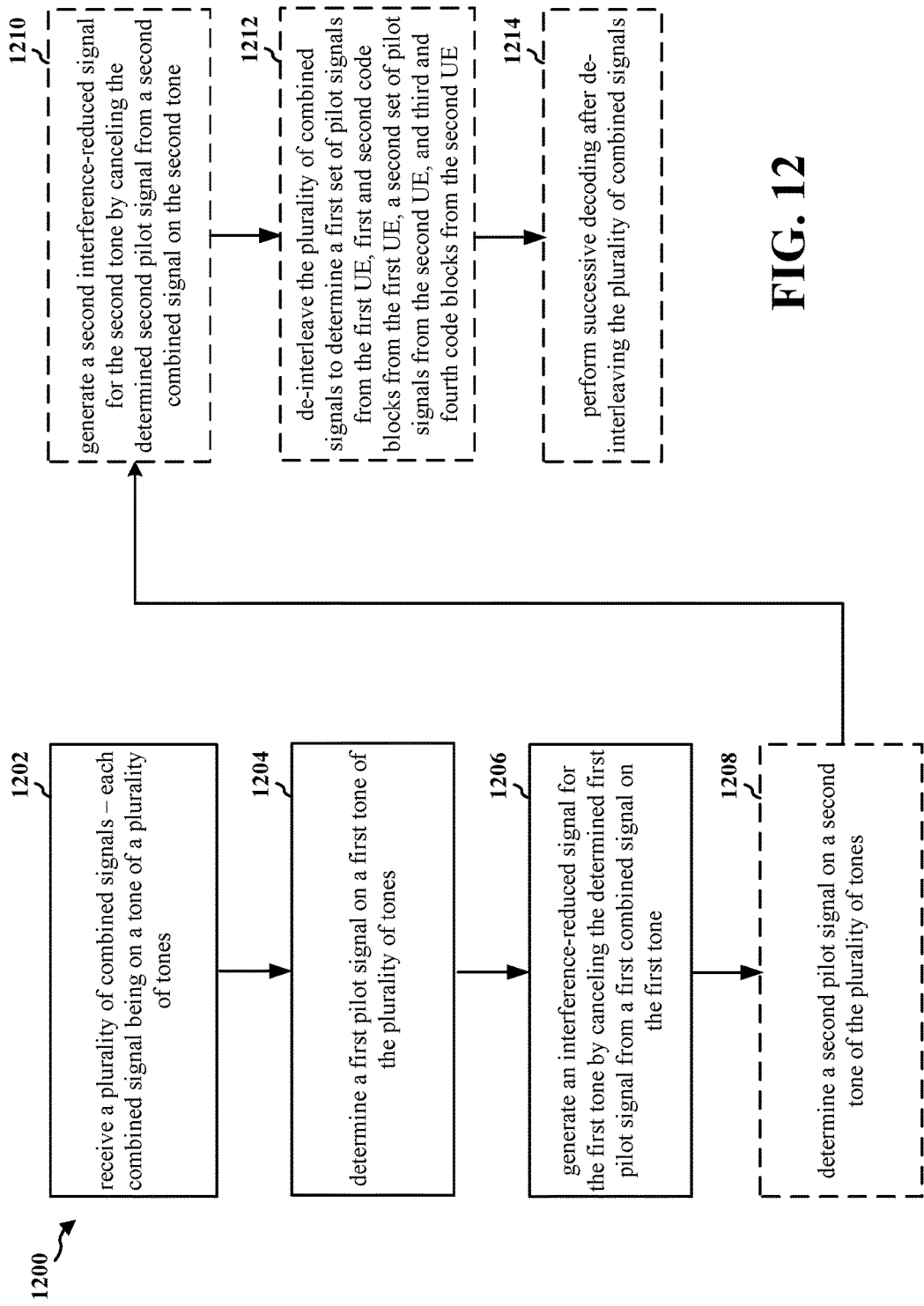
FIG. 12 is a flow chart of a method (process) for demodulation.

FIG. 12 is a flow chart 1200 of a method (process) for interference reduction, de-interleaving, and demodulation. The method may be performed by a base station (e.g., the eNodeB 802, the eNodeB 1002).

At 1202, the base station may receive a plurality of combined signals. Each combined signal may be on a tone of a plurality of tones. Each combined signal may include a first symbol of a first plurality of symbols (e.g., modulated symbols) from a first UE and a second symbol of a second plurality of symbols from a second UE. The first plurality of symbols may include at least one first pilot symbol and at least one first data symbol, and the second plurality of symbols may include including at least one second pilot symbol and at least one second data symbol. Each of the at least one first pilot symbol may be on a tone that carries one of the at least one second data symbol, and each of that least one second pilot symbol may be on a tone that carries one of the at least one first data symbol. For example, referring to FIG. 8, the base station may be the eNodeB 802. The eNodeB 802 may receive the combined signals. Each combined signal (e.g., $y_1$) may include a first symbol of a first plurality of symbols from the UE 852 (the first UE) and a second symbol of a second plurality of symbols from the UE 853 (the second UE). The first plurality of symbols may include the first pilot symbol $p_{1,1}$ and the first data symbol $x_{1,1}$. The second plurality of symbols from the UE 853 may include the second pilot symbol $p_{2,1}$ and the second data symbol $x_{2,1}$. The first pilot symbol may be on a tone that carries the second data symbol $x_{2,1}$, and the second pilot symbol $p_{2,1}$ may be on a different tone that carries the first data symbol $x_{1,1}$.

At 1204, the base station may determine a first pilot signal on a first tone of the plurality of tones. The first tone may carry a respective one of the at least one first pilot symbol and a respective one of the at least one second data symbol. The first pilot signal may be determined based on a channel element associated with the first tone and the respective one of the at least one first pilot symbol on the first tone. For example, referring to FIGS. 8 and 9, the eNodeB 802 may determine the first pilot signal, $h'_{1,1}p_{1,1}$, on a first tone of the tones 870. The first tone may carry the first pilot symbol, $p_{1,1}$, from the UE 852 and the second data symbol, $x_{2,1}$, from the UE 853. The pilot signal, $h'_{1,1}p_{1,1}$, may be determined based on the channel element, $h'_{1,1}$, associated with the first tone and the respective first pilot symbol $p_{1,1}$. In an aspect, the channel element may be determined based on received feedback from the UE 852 that indicates the channel element.

At 1206, the base station may generate an interference-reduced signal for the first tone by canceling the determined first pilot signal from a first combined signal on the first tone. For example, referring to FIGS. 8 and 9, the eNodeB 802 may generate the interference-reduced signal for the first tone, $y_1 - h'_{1,1}p_{1,1}$, by canceling the determined first pilot signal, $h'_{1,1}p_{1,1}$, from the first combined signal, $y_1$, on the first tone.

At 1208, the base station may determine a second pilot signal on a second tone of the plurality of tones. The second tone may carry a respective one of the at least one second pilot symbol and a respective one of the at least one first data symbol. The second pilot signal may be determined based on a second channel element associated with the second tone and the respective one of the at least one second pilot symbol on the second tone. For example, referring to FIGS. 8 and 9, the eNodeB 802 may determine the second pilot signal, $h'_{2,2}p_{2,1}$, on a second tone of the tones 870. The second tone may carry the second pilot symbol, $p_{2,1}$, from the UE 853 and the first data symbol, $x_{1,1}$, from the UE 852. The second pilot signal, $h'_{2,2}p_{2,1}$, may be determined based on the channel element, $h'_{2,2}$, associated with the second tone and the respective second pilot symbol $p_{2,1}$.

At 1210, the base station may generate a second interference-reduced signal for the second tone by canceling the determined second pilot signal from a second combined signal on the second tone. For example, referring to FIGS. 8 and 9, the eNodeB 802 may generated the second interference-reduced signal for the second tone, $y_2-h'_{2,2}p_{2,1}$, by canceling the determined first pilot signal, $h'_{2,2}p_{2,1}$, from the second combined signal, $y_2$, on the second tone.

At 1212, the base station may de-interleave the plurality of combined signals to determine a first set of pilot signals from the first UE, first and second code blocks from the first UE, a second set of pilot signals from the second UE, and third and fourth code blocks from the second UE. For example, referring to FIGS. 8 and 11, the eNodeB 802 (or the eNodeB 1002) may de-interleave the plurality of combined signals (e.g., $y_1$, $y_2$) to determine the pilot signals 1032 (the first set of pilot signals) from the UE 852, the first and second code blocks (CB11 and CB12) from the UE 852, the pilot signals 1033 (the second set of pilot signals) from the UE 853, and the third and fourth code blocks (CB21 and CB22) from the UE 853. In an aspect, the eNodeB 802 may de-interleave by arranging and demodulating the first set of pilot signals in a first portion of the tones, arranging and demodulating the first code block in a second portion of the tones, and arranging and demodulating the second code block in a third set of the tones.

At 1214, the base station may perform successive decoding after de-interleaving the plurality of combined signals. In one configuration, the base station may perform successive decoding by decoding the third code block by canceling the first set of pilot signals from the third code block, by decoding the first code block by canceling the third code block from the first code block, by decoding the fourth code block by canceling the first code block from the fourth code block, and by decoding the second code block by canceling the fourth code block from the second code block. For example, referring to FIGS. 8 and 11, the eNodeB 802 may perform success decoding by decoding CB21 by canceling the pilot signals 1032 from the CB21, by decoding CB12 by canceling the corresponding tones in CB21 from CB12, by decoding CB22 by canceling the corresponding tones from CB12 from CB22, and by decoding CB11 by canceling the corresponding tones from CB22 from CB11. In an aspect, CB11 may have corresponding tones canceled from CB22 and from the pilot signals 1033. As such, compared to other code blocks, CB11 may have improved accuracy. In this aspect, CB11 may be transmitted with a higher MCS index than other codeblocks.

In an aspect, as shown in FIG. 8, the pilot signals 1032 from the UE 1052 are shifted by a cyclic shift as compared to the pilot signals 1033 from the UE 1053. The cyclic shift may be provided (or transmitted) by the eNodeB 1002 to each of the UEs 1052, 1053.

Figure 13:
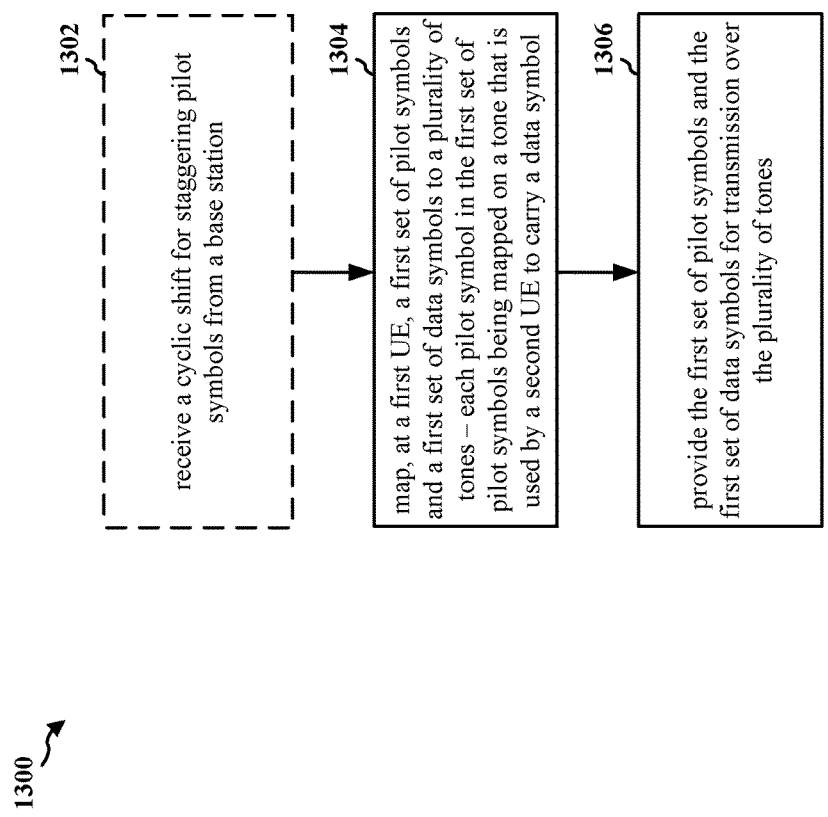
FIG. 13 is a flow chart of a method (process) for mapping pilot symbols and data symbols on multiple tones.

FIG. 13 is a flow chart 1300 of a method (process) for mapping pilot symbols and data symbols on multiple tones. The method may be performed by a UE (e.g., the UEs 852, 853, 1052, 1053).

At 1302, the UE may receive a cyclic shift for staggering pilot symbols from a base station. For example, referring to FIG. 8, the UE may be the UE 852. The UE 852 may receive a cyclic shift for staggering pilot symbols 862 from the eNodeB 802. Alternatively, the UE 852 may not receive the cyclic shift from the eNodeB 802. Instead, the UE 852 may select the cyclic shift from among a set of cyclic shifts based on an identifier associated with the UE 852.

At 1304, the UE may map a first set of pilot symbols and a first set of data symbols to a plurality of tones. Each pilot symbol in the first set of pilot symbols being mapped on a tone that is used by a second UE to carry a data symbol. For example, referring to FIG. 8, the UE 852 may map the pilot symbols $p_{1,1}$ and $p_{1,2}$ and a first set of data symbols $x_{1,1}$, $x_{1,2}$, $x_{1,3}$, $x_{1,4}$, $x_{1,5}$, $x_{1,6}$. The UE 852 may map the pilot symbols $p_{1,1}$ and $p_{1,2}$ onto tones used by the UE 853 (the second UE) to carry a data symbol, such as the data symbol $x_{2,1}$. In an aspect, the UE 852 may select the tone locations to map the pilot symbols based on a cyclic shift. The UE 852 may receive the cyclic shift from the eNodeB 802 or determine the cyclic shift. The UE 852 may determine which tones are used by other UEs, such as the UE 853, to transmit pilot symbols and map data symbols onto those tones.

At 1306, the UE may provide the first set of pilot symbols and the first set of data symbols for transmission over the plurality of tones. For example, referring to FIG. 8, the UE 852 may provide the pilot symbols $p_{1,1}$ and $p_{1,2}$ and a first set of data symbols $x_{1,1}$, $x_{1,2}$, $x_{1,3}$, $x_{1,4}$, $x_{1,5}$, $x_{1,6}$ for transmission over the tones by indicating the tones on which the modulated symbols are to be transmitted and placing the tone indication along with the modulated symbols on a bus to be transmitted via a transmitter or a transceiver.

Figure 14:
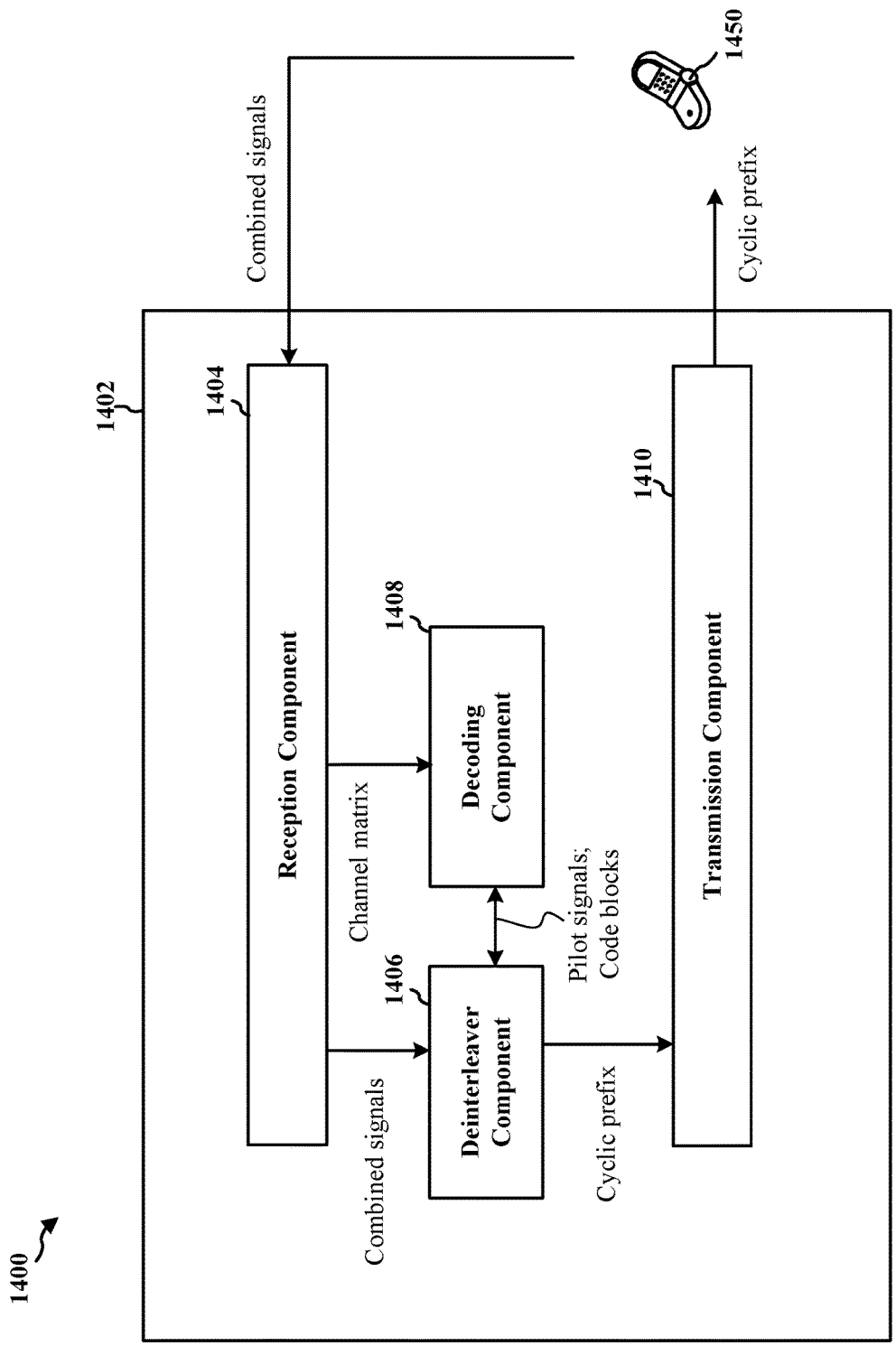
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be an eNB. The apparatus includes a reception component 1404, a deinterleaver component 1406, a decoding component 1408, and a transmission component 1410. The reception component 1404 may be configured to receive a plurality of combined signals. Each combined signal may be on a tone of a plurality of tones. Each combined signal may include a first symbol of a first plurality of symbols from a first UE and a second symbol of a second plurality of symbols from a second UE. The first plurality of symbols may include at least one first pilot symbol and at least one first data symbol. The second plurality of symbols may include at least one second pilot symbol and at least one second data symbol. Each of the at least one first pilot symbol may be on a tone that carries one of the at least one second data symbol. The deinterleaver component 1406 may be configured to determine a first pilot signal on a first tone of the plurality of tones. The first tone may carry a respective one of the at least one first pilot symbol and a respective one of the at least one second data symbol. The first pilot signal may be determined based on a channel element associated with the first tone and the respective one of the at least one first pilot symbol on the first tone. The decoding component 1408 may be configured to generate an interference-reduced signal for the first tone by canceling the determined first pilot signal from a first combined signal on the first tone. In another configuration, the deinterleaver component 1406 may be configured to determine a second pilot signal on a second tone of the plurality of tones. The second tone may carry a respective one of the at least one second pilot symbol and a respective one of the at least one first data symbol. The second pilot signal may be determined based on a second channel element associated with the second tone and the respective one of the at least one second pilot symbol on the second tone. The decoding component 1408 may be configured to generate a second interference-reduced signal for the second tone by canceling the determined second pilot signal from a second combined signal on the second tone. In an aspect, a first set of periodic pilot signals from the first UE and a second set of periodic pilot signals from the second UE are shifted by a cyclic shift. In another aspect, the transmission component 1410 may be configured to provide a cyclic shift to the first UE. In another configuration, the deinterleaver component 1406 may be configured to deinterleave the plurality of combined signals to determine a first set of pilot signals from the first UE, first and second code blocks from the first UE, a second set of pilot signals from the second UE, and third and fourth code blocks from the second UE. In an aspect, the first set of pilot signals may correspond to a first number tones. The first number tones may be equal to half a second number of tones in the third code block. In another aspect, the first set of pilot signals from the first UE may overlap with the third code block from the second UE, and the second set of pilot signals from the second UE may overlap with the second code block from the first UE. In another configuration, the decoding component 1408 may be configured to perform successive decoding after deinterleaving the plurality of combined signals. In another configuration, the decoding component 1408 may be configured to perform successive decoding by decoding the third code block by canceling the first set of pilot signals from the third code block, by decoding the first code block by canceling the third code block from the first code block, by decoding the fourth code block by canceling the first code block from the fourth code block, and by decoding the second code block by canceling the fourth code block from the second code block.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
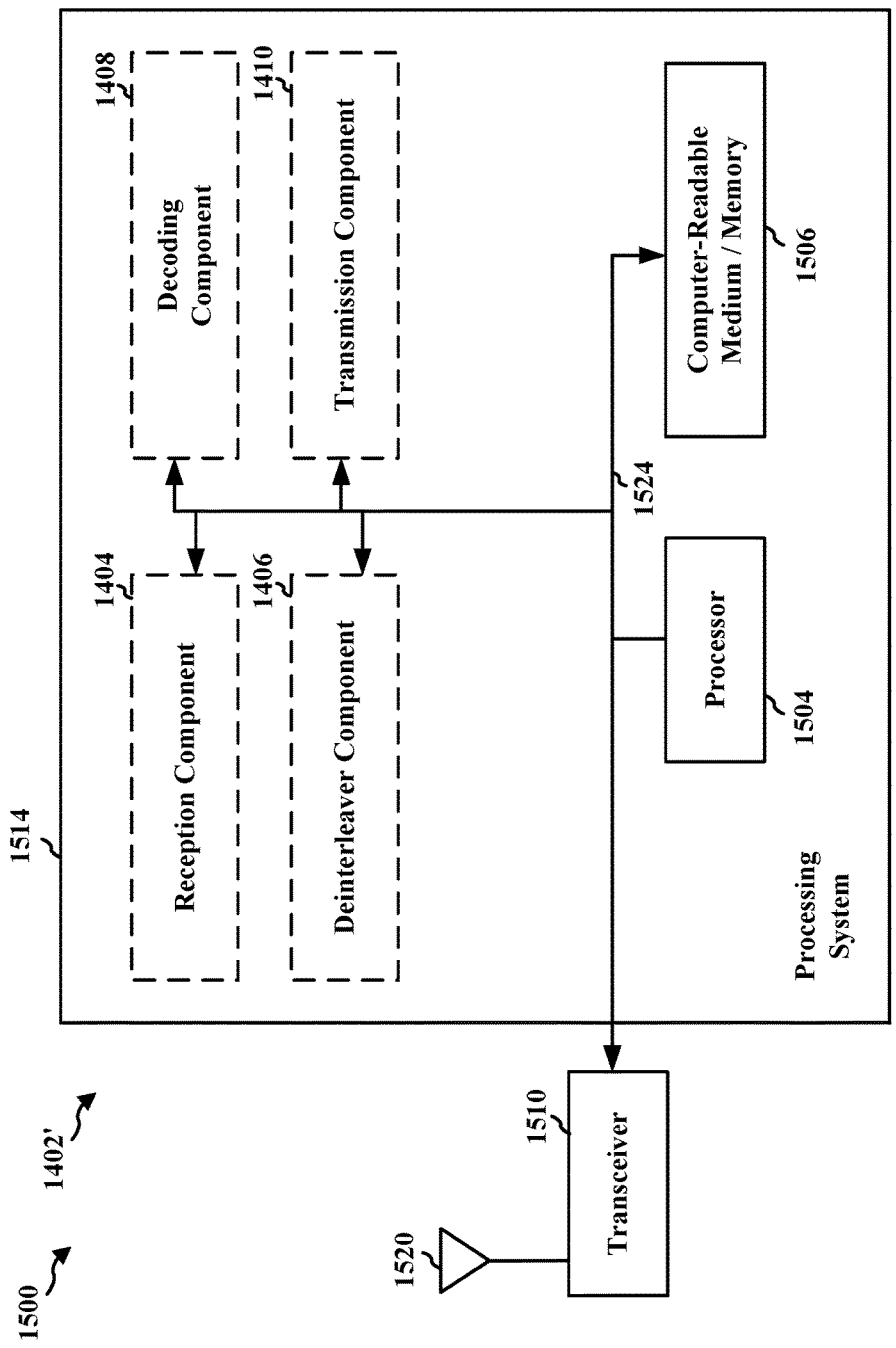
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410. The components may be software components running in the processor 1504, resident/stored in the computer readable medium/memory 1506, one or more hardware components coupled to the processor 1504, or some combination thereof. The processing system 1514 may be a component of the eNB 310 and may include the memory 376 and/or at least one of the TX processor 316, the RX processor 370, and the controller/processor 375.

In one configuration, the apparatus 1402/1402' for wireless communication includes means for receiving a plurality of combined signals. Each combined signal may be on a tone of a plurality of tones. Each combined signal may include a first symbol of a first plurality of symbols from a first UE and a second symbol of a second plurality of symbols from a second UE. The first plurality of symbols may include at least one first pilot symbol and at least one first data symbol. The second plurality of symbols may include at least one second pilot symbol and at least one second data symbol. Each of the at least one first pilot symbol may be on a tone that carries one of the at least one second data symbol. The apparatus may include means for determining a first pilot signal on a first tone of the plurality of tones. The first tone may carry a respective one of the at least one first pilot symbol and a respective one of the at least one second data symbol. The first pilot signal may be determined based on a channel element associated with the first tone and the respective one of the at least one first pilot symbol on the first tone. The apparatus may include means for generating an interference-reduced signal for the first tone by canceling the determined first pilot signal from a first combined signal on the first tone. In another configuration, the apparatus may include means for determining a second pilot signal on a second tone of the plurality of tones. The second tone may carry a respective one of the at least one second pilot symbol and a respective one of the at least one first data symbol. The second pilot signal may be determined based on a second channel element associated with the second tone and the respective one of the at least one second pilot symbol on the second tone. The apparatus may include means for generating a second interference-reduced signal for the second tone by canceling the determined second pilot signal from a second combined signal on the second tone. In an aspect, a first set of periodic pilot signals from the first UE and a second set of periodic pilot signals from the second UE are shifted by a cyclic shift. In another aspect, the apparatus may include means for providing a cyclic shift to the first UE (e.g., a bus interface, a transmitter, and/or transceiver). In another configuration, the apparatus may include means for deinterleaving the plurality of combined signals to determine a first set of pilot signals from the first UE, first and second code blocks from the first UE, a second set of pilot signals from the second UE, and third and fourth code blocks from the second UE. In an aspect, the first set of pilot signals may correspond to a first number tones. The first number tones may be equal to half a second number of tones in the third code block. In another aspect, the first set of pilot signals from the first UE may overlap with the third code block from the second UE, and the second set of pilot signals from the second UE may overlap with the second code block from the first UE. In another configuration, the apparatus may include means for performing successive decoding after deinterleaving the plurality of combined signals. In another configuration, the means for performing successive decoding may be configured to decode the third code block by canceling the first set of pilot signals from the third code block, to decode the first code block by canceling the third code block from the first code block, to decode the fourth code block by canceling the first code block from the fourth code block, and to decode the second code block by canceling the fourth code block from the second code block. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
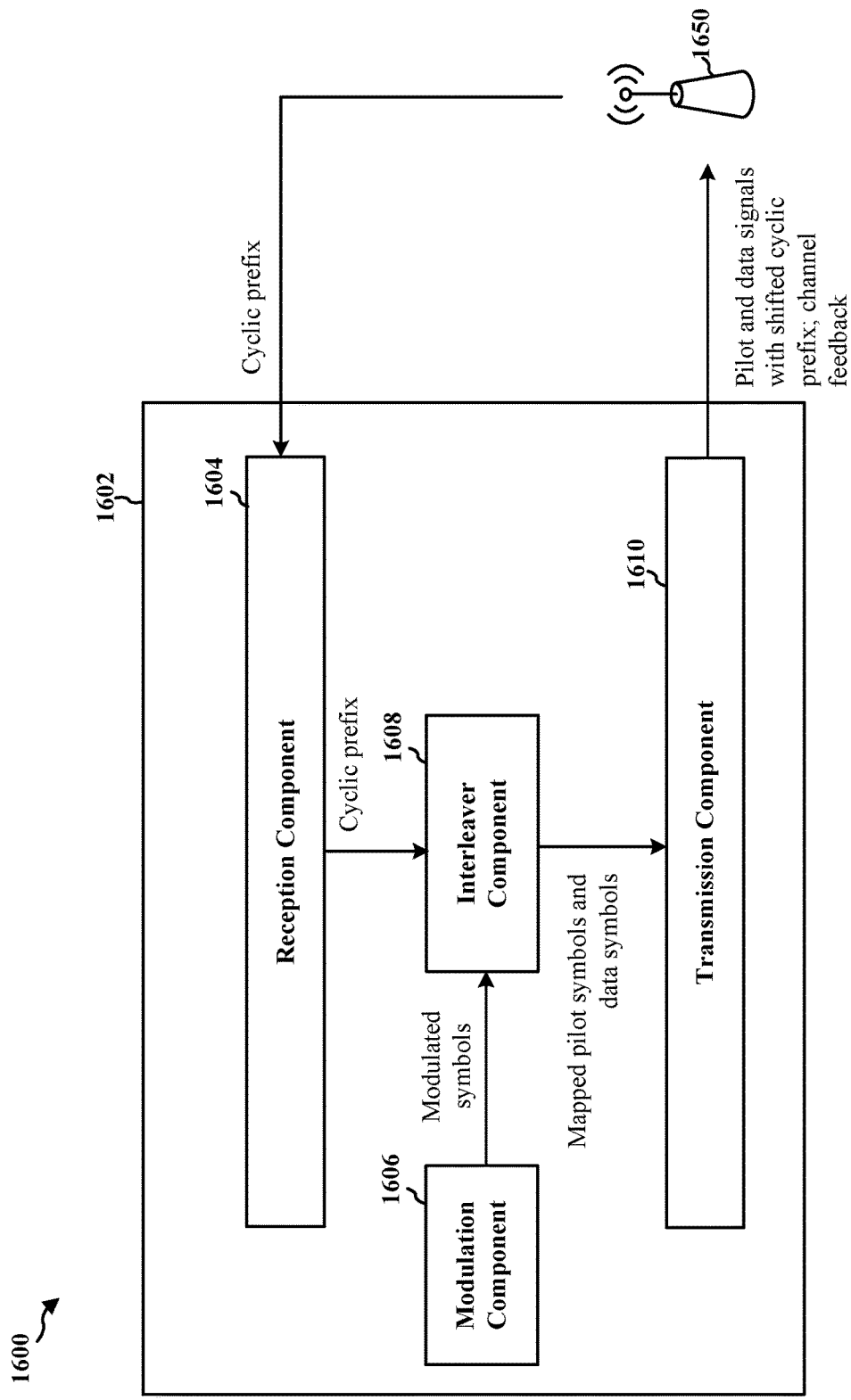
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a UE. The apparatus includes a reception component 1604, a modulation component 1606, an interleaver component 1608, and a transmission component 1610. A modulation component 1606 may be configured to map information (e.g., data and pilot information) onto data symbols or pilot symbols using QPSK, QAM, or other modulation techniques. The interleaver component 1608 may be configured to map, at a first UE, a first set of pilot symbols and a first set of data symbols to a plurality of tones. Each pilot symbol in the first set of pilot symbols may be mapped on a tone that is used by a second UE to carry a data symbol. The transmission component 1610 may be configured to provide the mapped first set of pilot symbols and the mapped first set of data symbols for transmission over the plurality of tones. In an aspect, a data symbol in the first set of data symbols is mapped on a tone that is used by the second UE to carry a pilot symbol. In another aspect, the first set of pilot symbols may be transmitted on tones shifted by a cyclic shift from a second set of pilot symbols that is concurrently transmitted by the second UE. In another configuration, the reception component 1604 may be configured to receive the cyclic shift for staggering the first set of pilot symbols from a base station. In another aspect, the cyclic shift for staggering the first set of pilot symbols may be randomly selected from a set of cyclic shift values based on an identifier associated with the first UE. In another aspect, the first set of data symbols may be associated with a same code block.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
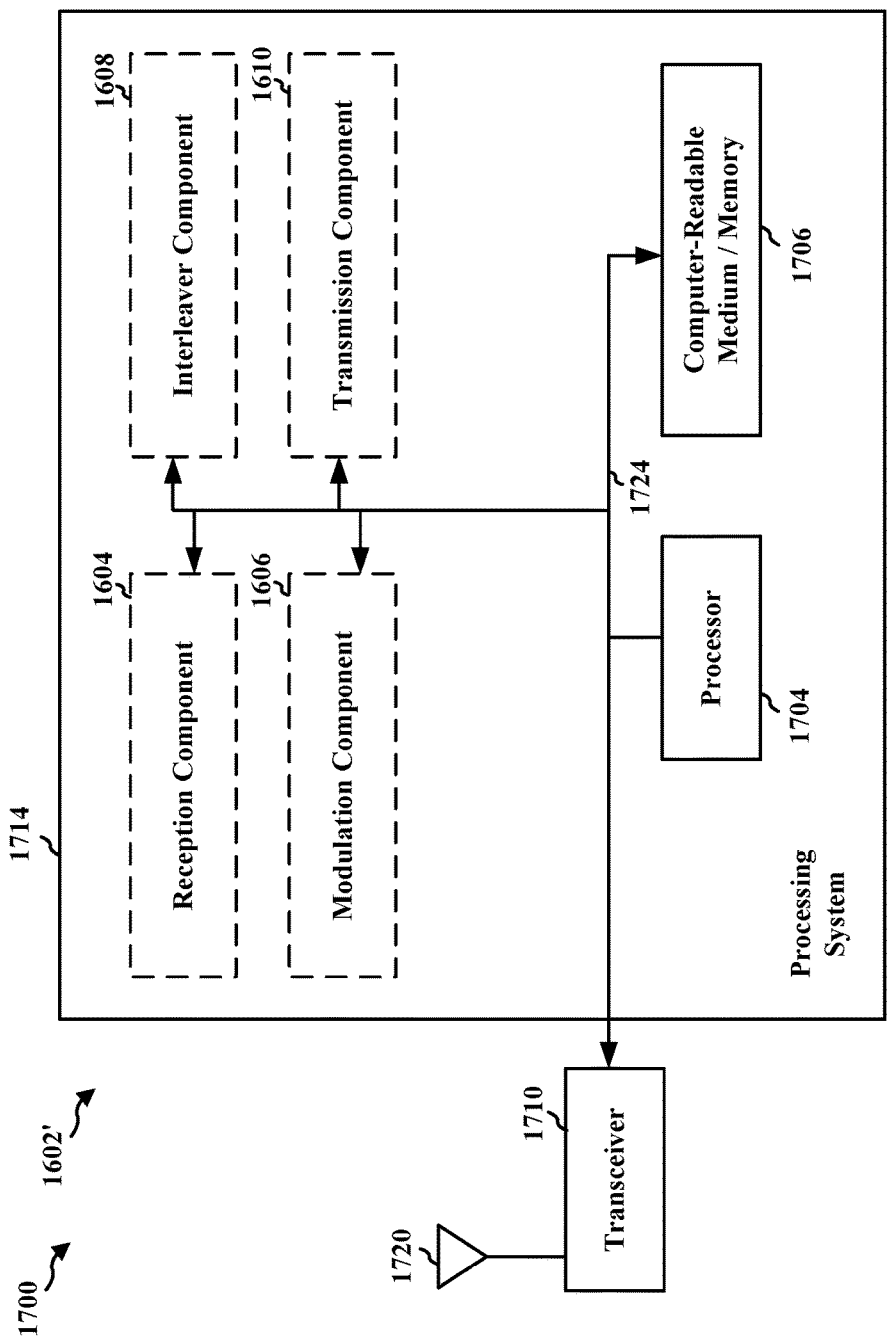
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610 and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1610, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610. The components may be software components running in the processor 1704, resident/stored in the computer readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359.

In one configuration, the apparatus 1602/1602' for wireless communication includes means for mapping, at a first UE, a first set of pilot symbols and a first set of data symbols to a plurality of tones. Each pilot symbol in the first set of pilot symbols may be mapped on a tone that is used by a second UE to carry a data symbol. The apparatus may include means for providing the mapped first set of pilot symbols and the mapped first set of data symbols for transmission over the plurality of tones. In an aspect, a data symbol in the first set of data symbols is mapped on a tone that is used by the second UE to carry a pilot symbol. In another aspect, the first set of pilot symbols may be transmitted on tones shifted by a cyclic shift from a second set of pilot symbols that is concurrently transmitted by the second UE. In another configuration, the apparatus may include means for receiving the cyclic shift for staggering the first set of pilot symbols from a base station. In another aspect, the cyclic shift for staggering the first set of pilot symbols may be randomly selected from a set of cyclic shift values based on an identifier associated with the first UE. In another aspect, the first set of data symbols may be associated with a same code block.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function under the provisions of 35 U.S.C. § 112(f) unless the element is expressly recited using the phrase "means for."

What is claimed is:

1. An apparatus for wireless communication, comprising:
    a processing system configured to:
        receive a plurality of combined signals, each combined signal being on a tone of a plurality of tones, each combined signal comprising a first symbol of a first plurality of symbols from a first user equipment (UE) and a second symbol of a second plurality of symbols from a second UE, the first plurality of symbols including at least one first pilot symbol and at least one first data symbol, the second plurality of symbols including at least one second pilot symbol and at least one second data symbol, each of the at least one first pilot symbol being on a tone that carries one of the at least one second data symbol;
        determine a first pilot signal on a first tone of the plurality of tones, the first tone carrying a respective one of the at least one first pilot symbol and a respective one of the at least one second data symbol, the first pilot signal being determined based on a channel element associated with the first tone and the respective one of the at least one first pilot symbol on the first tone; and
        generate an interference-reduced signal for the first tone by canceling the determined first pilot signal from the first tone of the plurality of tones;
        de-interleave the plurality of combined signals to determine a first set of pilot signals from the first UE, first and second code blocks from the first UE, a second set of pilot signals from the second UE, and third and fourth code blocks from the second UE; and
        perform successive decoding of code blocks after de-interleaving the plurality of combined signals by:
            decoding the third code block by canceling the first set of pilot signals from the third code block;
            decoding the first code block by canceling the third code block from the first code block;
            decoding the fourth code block by canceling the first code block from the fourth code block; and
            decoding the second code block by canceling the fourth code block from the second code block.

2. The apparatus of claim 1, wherein the processing system is further configured to:
    determine a second pilot signal on a second tone of the plurality of tones, the second tone carrying a respective one of the at least one second pilot symbol and a respective one of the at least one first data symbol, the second pilot signal being determined based on a second channel element associated with the second tone and the respective one of the at least one second pilot symbol on the second tone; and
    generate a second interference-reduced signal for the second tone by canceling the determined second pilot signal from the second tone of the plurality of tones.

3. The apparatus of claim 1, wherein a first set of periodic pilot signals from the first UE and a second set of periodic pilot signals from the second UE are shifted by a cyclic shift.

4. The apparatus of claim 1, wherein the processing system is further configured to provide a cyclic shift to the first UE.

5. The apparatus of claim 1, wherein the first set of pilot signals corresponds to a first number of tones, the first number of tones being equal to half a second number of tones in the third code block.

6. The apparatus of claim 1, wherein the first set of pilot signals from the first UE overlaps with the third code block from the second UE, and the second set of pilot signals from the second UE overlaps with the second code block from the first UE.

7. A method for wireless communication, comprising:
    receiving a plurality of combined signals, each combined signal being on a tone of a plurality of tones, each combined signal comprising a first symbol of a first plurality of symbols from a first user equipment (UE) and a second symbol of a second plurality of symbols from a second UE, the first plurality of symbols including at least one first pilot symbol and at least one first data symbol, the second plurality of symbols including at least one second pilot symbol and at least one second data symbol, each of the at least one first pilot symbol being on a tone that carries one of the at least one second data symbol;

determining a first pilot signal on a first tone of the plurality of tones, the first tone carrying a respective one of the at least one first pilot symbol and a respective one of the at least one second data symbol, the first pilot signal being determined based on a channel element associated with the first tone and the respective one of the at least one first pilot symbol on the first tone;

generating an interference-reduced signal for the first tone by canceling the determined first pilot signal from the first tone of the plurality of tones;

de-interleaving the plurality of combined signals to determine a first set of pilot signals from the first UE, first and second code blocks from the first UE, a second set of pilot signals from the second UE, and third and fourth code blocks from the second UE; and performing successive decoding of code blocks after de-interleaving the plurality of combined signals by:
 decoding the third code block by canceling the first set of pilot signals from the third code block;
 decoding the first code block by canceling the third code block from the first code block;
 decoding the fourth code block by canceling the first code block from the fourth code block; and
 decoding the second code block by canceling the fourth code block from the second code block.

8. The method of claim 7, further comprising:
determining a second pilot signal on a second tone of the plurality of tones, the second tone carrying a respective one of the at least one second pilot symbol and a respective one of the at least one first data symbol, the second pilot signal being determined based on a second channel element associated with the second tone and the respective one of the at least one second pilot symbol on the second tone;

generating a second interference-reduced signal for the second tone by canceling the determined second pilot signal from the second tone of the plurality of tones, wherein the first set of pilot symbols are transmitted on tones shifted by a cyclic shift from a second set of pilot symbols that is concurrently transmitted by the second UE; and receiving the cyclic shift for staggering the first set of pilot symbols from a base station.

9. The method of claim 7, wherein a first set of periodic pilot signals from the first UE and a second set of periodic pilot signals from the second UE are shifted by a cyclic shift.

10. The method of claim 7, further comprising providing a cyclic shift to the first UE.

11. The method of claim 7, wherein the first set of pilot signals corresponds to a first number of tones, the first number of tones being equal to half a second number of tones in the third code block.

12. The method of claim 7, wherein the first set of pilot signals from the first UE overlaps with the third code block from the second UE, and the second set of pilot signals from the second UE overlaps with the second code block from the first UE.

* * * * *